United States Patent
Watanabe et al.

(10) Patent No.: US 8,353,060 B2
(45) Date of Patent: Jan. 8, 2013

(54) SCANNING PROBE MICROSCOPE AND A MEASURING METHOD USING THE SAME

(75) Inventors: Masahiro Watanabe, Yokohama (JP); Shuichi Baba, Hitachi (JP); Toshihiko Nakata, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 256 days.

(21) Appl. No.: 12/828,590

(22) Filed: Jul. 1, 2010

(65) Prior Publication Data

US 2011/0055982 A1 Mar. 3, 2011

(30) Foreign Application Priority Data

Aug. 28, 2009 (JP) .................................. 2009-198553

(51) Int. Cl.
*G01L 9/00* (2006.01)
*G01L 9/08* (2006.01)

(52) U.S. Cl. ................. 850/26; 850/2; 850/10; 250/306

(58) Field of Classification Search ................ 850/2, 10, 850/26; 250/306
See application file for complete search history.

(56) References Cited

U.S. PATENT DOCUMENTS

| | | | | |
|---|---|---|---|---|
| 5,705,814 A * | 1/1998 | Young et al. | ........................ | 850/2 |
| 5,939,709 A * | 8/1999 | Ghislain et al. | ................ | 250/216 |
| 6,057,547 A * | 5/2000 | Park et al. | ........................ | 850/10 |
| 6,130,427 A * | 10/2000 | Park et al. | ........................ | 850/26 |
| 6,265,718 B1 * | 7/2001 | Park et al. | ........................ | 850/10 |
| 6,877,365 B2 * | 4/2005 | Watanabe et al. | ................ | 73/105 |
| 7,013,717 B1 * | 3/2006 | Struckmeier et al. | ........... | 73/105 |
| 7,044,007 B2 * | 5/2006 | Struckmeier et al. | ....... | 73/862.51 |
| 7,067,806 B2 * | 6/2006 | Watanabe et al. | .............. | 250/306 |
| 7,288,762 B2 * | 10/2007 | Iyoki et al. | ..................... | 250/306 |
| 7,323,684 B2 * | 1/2008 | Watanabe et al. | .............. | 250/306 |
| 7,372,025 B2 * | 5/2008 | Hoen et al. | ..................... | 250/306 |
| 7,596,989 B2 * | 10/2009 | Humphris et al. | ............... | 73/105 |
| 7,665,349 B2 * | 2/2010 | Mininni et al. | .................. | 73/105 |
| 2004/0245600 A1 | 12/2004 | Kamiya | | |
| 2007/0024295 A1 * | 2/2007 | Humphris et al. | ............ | 324/754 |
| 2008/0276695 A1 * | 11/2008 | Prater et al. | ..................... | 73/105 |

FOREIGN PATENT DOCUMENTS

| | | |
|---|---|---|
| JP | 11-023584 | 1/1999 |
| JP | 2004-125540 | 4/2004 |
| JP | 3544453 | 4/2004 |
| JP | 2004-303991 | 10/2004 |
| JP | 2005-347484 | 12/2005 |

* cited by examiner

*Primary Examiner* — David A Vanore
(74) *Attorney, Agent, or Firm* — Antonelli, Terry, Stout & Kraus, LLP.

(57) ABSTRACT

It is difficult for a scanning probe microscope according to the conventional technology to operate a probe for scanning and positioning in a wide range and for high-precision scanning in a narrow range. A scanning probe microscope according to the invention uses probe driving actuators for coarse adjustment and fine adjustment. For scanning and positioning in a wide range, the coarse adjustment actuator is switched to fast responsiveness. For scanning in a narrow range, the coarse adjustment actuator is switched to slow responsiveness. Instead, positional noise is reduced and the fine adjustment actuator is mainly used for scanning in a narrow range. The probe is capable of not only scanning and positioning in a wide range but also high-precision scanning in a narrow range.

17 Claims, 24 Drawing Sheets

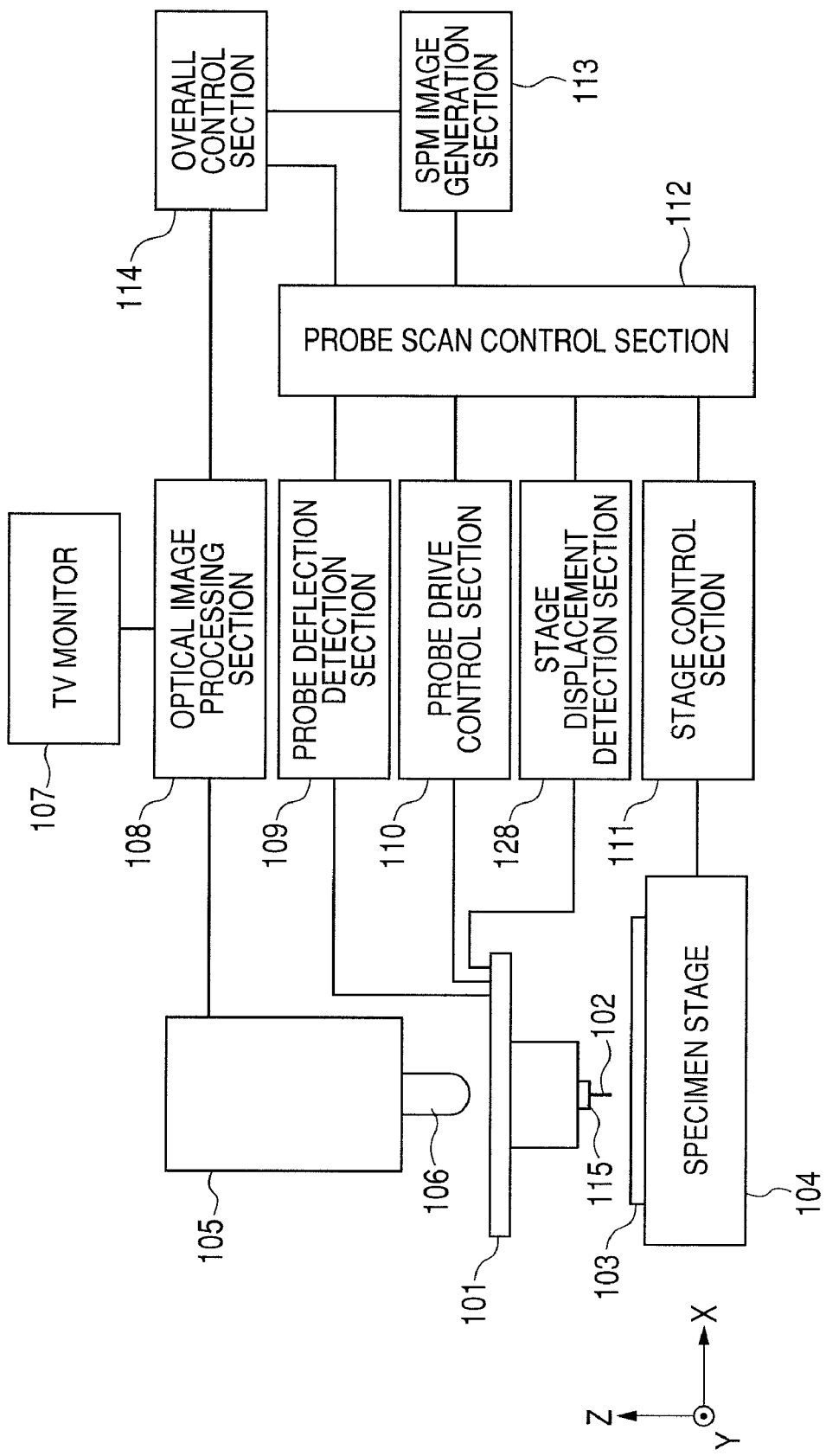

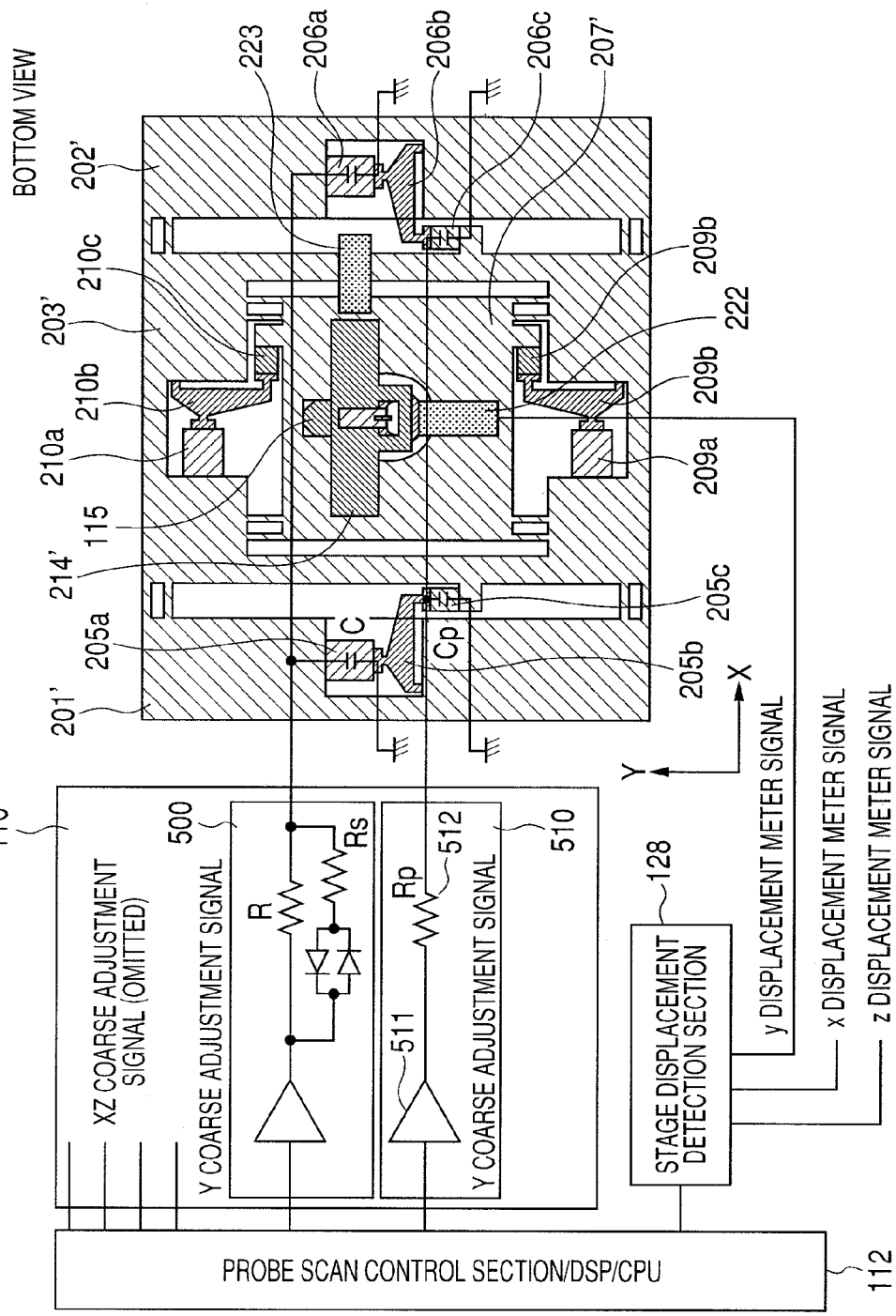

SYNTHESIZED CAPACITANCE   $Cp/(1+\alpha)$
SYNTHESIZED TIME CONSTANT   $Rp \cdot Cp/(1+\alpha)$
                    WHERE   $Rb \gg Rp$

SCANNING PROBE MICROSCOPE AND A MEASURING METHOD USING THE SAME

CLAIM OF PRIORITY

The present invention claims priority from Japanese patent application JP2009-198553 filed on Aug. 28, 2009, the content of which is hereby incorporated by reference into this application.

BACKGROUND

The present invention relates to a scanning probe microscope used for accurately measuring a specimen shape and the like.

While semiconductor circuits are highly integrated and are microscopically patterned, there is increasing importance on inspection measurement technologies and failure analysis technologies in semiconductor manufacturing processes. While recording densities of hard disk units are increasing, there is also increasing importance on measurement of microstructure and flatness of magnetic parts of read/write heads, surface roughness of recording media, and stereoscopic shapes based on the striped or dotted structure for further improving recording densities. A scanning probe microscope (SPM) is optimal for these uses. The SPM provides a widely known technique in which a microscopic probe scans with its tip in vicinity to or in contact with a specimen surface so as to measure the specimen surface shape at the atomic level.

In surface shape measurement using the SPM, an inspection region is limited to a bright portion smaller than or equal to several hundreds of micrometers square. When a microscopic area is measured at the atomic level, it is necessary to measure a visual field as narrow as several tens to hundreds of nanometers with an accuracy of atomic level or higher. A mechanical section for probe scanning requires high positioning accuracy. It is necessary to fast observe as wide a range as several tens of micrometers in order to find a measurement region. There is also a need for fast measuring irregularity on the specimen surface in as wide a range as several hundreds of micrometers.

The SPM has the advantage of measuring stereoscopic shapes on the specimen surface at high resolution of approximately 0.1 nanometers. However, the SPM requires much time in positioning and measurement of a measure point and is incapable of providing sufficient measurement throughput. The SPM is not used with a manufacturing line for devices such as semiconductors and hard disk units in line, i.e., during the manufacturing process. The SPM has been mainly used for defect analysis offline. On the other hand, it is expected to provide an inline SPM when a measurement result from the SPM can promptly detect an anomaly in various process apparatuses and the measurement result can be fed back to process conditions for the process apparatuses. In such case, the inline SPM is capable of minimizing defective products and improving the fabrication yield of the manufacturing line. The success of the inline SPM depends on how many measure points the inline SPM can process or measure per unit time. An actual manufacturing line requires processing time shorter than or equal to 20 seconds per unit. The requirement is equivalent to measurement throughput of 30 WPH (wafers per hour).

A piezoelectric element is generally used as an actuator for the mechanical section in order to highly accurately position the SPM probe over a specimen. For example, Japanese Published Unexamined Patent Application No. 2004-303991 describes embodiment of a highly accurate SPM that uses parallel flat plates for three axes X, Y, and Z, drives the plates using piezoelectric elements, measures a probe position using a displacement gauge, and controls the probe position. Patent publication P3544453 discloses the three-dimensional microscopic scan mechanism as another probe drive mechanism for improving the probe positioning accuracy. According to the mechanism, a Y stage is connected to an external frame through an elastic member. An XZ stage is formed in the Y stage so as to be used as an X stage and a Z stage and is connected to the Y stage through an elastic member. Three voice coil motors drive the three-axis stages.

All the stages are integrally formed using the same member. A spindle transmits a drive force of the voice coil motor to the stages. Each spindle is structured to be always pressed parallel to the stage operation direction independently of stage displacement. When only the Y stage operates, for example, all the elastic members connecting the external frame with the Y stage deform evenly and elastically, and apply unnecessary force to the axes of motion other than the Y axis. The probe scan mechanism can accurately control probe positioning independently of the three axes. Japanese Published Unexamined Patent Application No. 2005-347484 describes the method of improving the stage positioning resolution through the use of a piezoelectric element that includes two types of piezoelectric elements connected to each other for fine adjustment and coarse adjustment.

Japanese Published Unexamined Patent Application No. 2004-125540 discloses the SPM configuration for improving the measurement throughput. An approach sensor includes an objective lens, a laser diode, and a photodiode that are placed immediately above a probe. The approach sensor detects a specimen surface position. The specimen surface fast approaches the probe tip position to shorten the time for the SPM to start measurement and improve the SPM measurement throughput. The SPM disclosed in Japanese Published Unexamined Patent Application No. 2005-347484 is configured to place an objective lens immediately above a position where the probe comes in contact with a specimen. An observational optical system detects the measurement position on a specimen. The measurement operation can then start without moving the specimen position. The SPM measurement throughput can be improved.

It is difficult for a conventional SPM to allow the probe to fast scan a wide range and accurately scan a microscopic range at high resolution concurrently. There has been no alternative but to configure the SPM so that it can measure only a narrow range at the sacrifice of operability or it can measure a wide range at the sacrifice of accurate and high-resolution measurement in a narrow range.

SUMMARY

It is an object of the present invention to provide a scanning probe microscope and a measuring method using the same capable of solving the problem of the conventional technology so that a probe can fast scan a wide range and accurately scan a microscopic range at high resolution.

The present invention provides a scanning probe microscope including: a probe section having a cantilever and a probe fixed near a tip of the cantilever; probe section drive means for driving the probe section so that the probe scans a specimen surface by repeatedly being close to or in contact with the specimen surface and being apart from the specimen surface; displacement amount detection means for detecting a displacement amount of the probe section while the probe section drive means keeps the probe close to or in contact with the specimen surface; and a signal processing means for acquiring shape information about the specimen surface based on the displacement amount of the probe section detected by the displacement amount detection means. The probe drive means includes: a drive section for independently driving the probe in three mutually-perpendicular axis directions; and a drive speed switch section for switching a drive speed at least in one axis direction while the drive section drives the probe section.

To achieve the above-mentioned object, the invention provides a measurement method using a scanning probe microscope, including the steps of: driving a probe section having a cantilever and a probe fixed near a tip of the cantilever so that the probe scans a specimen surface by repeatedly being close to or in contact with the specimen surface and being apart from the specimen surface; detecting a displacement amount of the probe section scanning the specimen surface; and acquiring shape information about the specimen surface based on the detected displacement amount of the probe section. The probe is driven to scan the specimen surface by switching a drive speed in at least one axis direction while driving.

The scanning probe microscope according to the invention combines two types of actuators: one for short strokes and the other for long strokes. The former features high-resolution and fast response. The latter features long strokes and slow response. The scanning probe microscope can position a probe for scanning at high resolution with long strokes. A driver for long strokes is provided with a responsiveness switch mechanism so that this driver fast responds only when a voltage changes considerably. The scanning probe microscope can ensure both fast responsiveness for long strokes and high stability for positioning. Accordingly, it is possible to provide the scanning probe microscope that is capable of scanning for long strokes at the level of several tens to hundreds of micrometers and the probe positioning accuracy at the level of subnanometers to picometers.

The actuator for long strokes can be fast driven. When the actuator is used for the Z axis, the probe can fast approach a specimen before the measurement starts. When the actuator is used for the XY axes, it is possible to fast scan a wide range, fast find a pattern to be measured, and highly precisely scan a position corresponding to the pattern. These features can improve the SPM throughput.

The SPM according to the invention is applicable to manufacturing processes of semiconductors or hard disks. In such case, it is possible to optimize process conditions of a manufacturing apparatus based on measurement results from the SPM and improve the fabrication yield of the device manufacturing process.

These features and advantages of the invention will be apparent from the following more particular description of preferred embodiments of the invention, as illustrated in the accompanying drawings.

BRIEF DESCRIPTION OF THE DRAWINGS

FIG. 1 is a block diagram showing the entire configuration of a scanning probe microscope;

FIG. 4A is a plan view showing the configuration of major portions of the probe driving section and a driver circuit section in the scanning probe microscope;

DESCRIPTION OF THE PREFERRED EMBODIMENTS

Figure 2A:
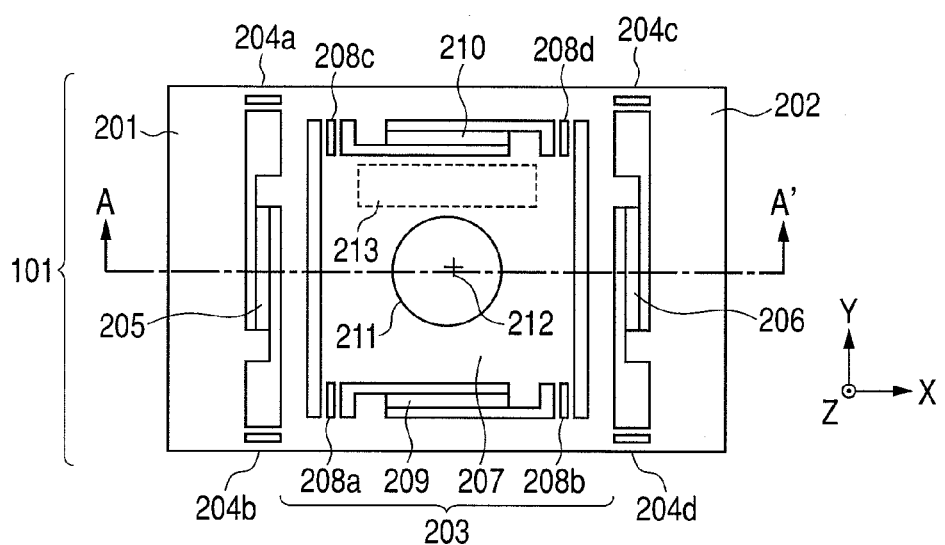
FIG. 2A is a plan view showing the approximate configuration of a probe driving section in the scanning probe microscope.
Figure 2B:
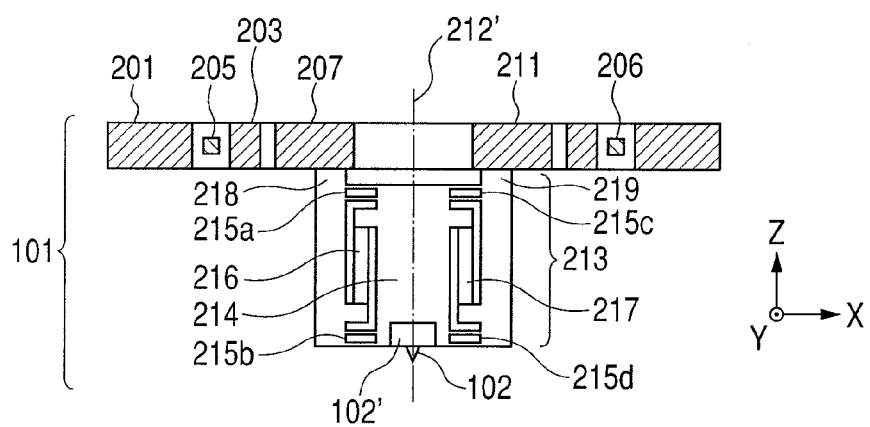
FIG. 2B is an elevational view in section showing the approximate configuration of the probe driving section in the scanning probe microscope.
Figure 2C:
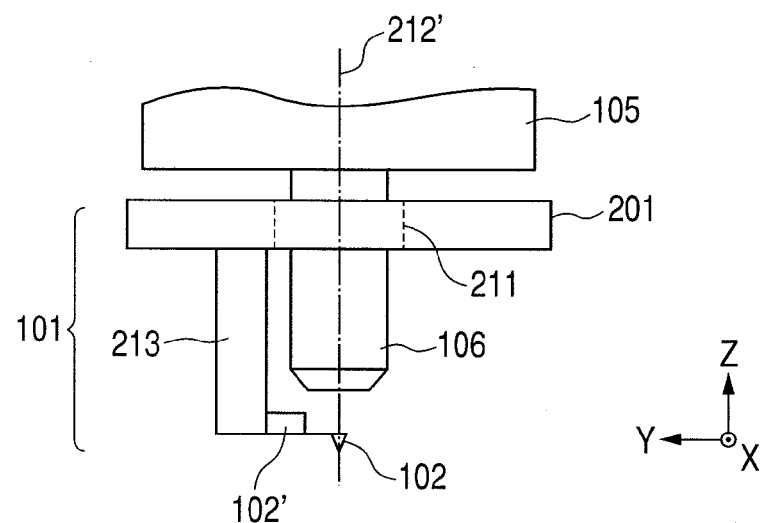
FIG. 2C is a side view showing the approximate configuration of the probe driving section in the scanning probe microscope.
Figure 3:
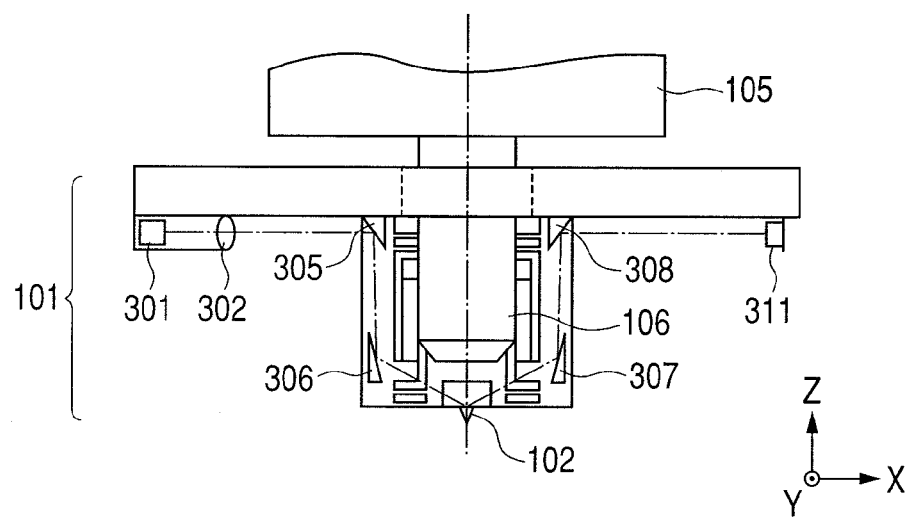
FIG. 3 is an elevational view showing the approximate configuration of a probe deflection detecting optical system.

As an embodiment of the present invention, the following describes the configuration of an SPM as the basis of the invention with reference to FIGS. 1 through 3. In FIG. 1, reference numeral 103 denotes a specimen to be measured; and 104 denotes a specimen stage that holds the specimen 103 with vacuum and moves it in X, Y, and Z directions and in a rotation direction within an XY plane. A stage control section 111 controls specimen stage operations. A probe drive mechanism 101 holds a probe 102 using a probe holder 115.

The probe drive mechanism 101 accurately positions the probe 102 in X, Y, and Z directions over the specimen 103. The probe 102 is made of a silicon material and is processed through etching or a converged ion beam so as to be tipped 10 nanometers or less in diameter. Alternatively, the probe 102 may be tipped with a carbon nanotube approximately 10 nanometers in diameter. The probe 102 includes a cantilever and a probe formed at the tip of the cantilever. This specification represents a set of the cantilever and the probe simply as a probe. Above the probe drive mechanism 101, there is provided an observational optical system lens tube 105 having an objective lens 106.

The observational optical system 105 contains an imaging camera inside. The objective lens 106 enlarges an optical image for the surface of the specimen 103. The enlarged optical image passes through an optical image processing section 108 and is displayed on a TV monitor 107. The observational optical system 105 and the objective lens 106 each have a focus axis for vertical movement in the Z direction using a movement mechanism (not shown). A small piezoelectric element may be built in the probe holder 115 so as to be able to oscillate the held probe 102 with an amplitude of several to several tens of nanometers.

FIGS. 2A through 2C are explanatory diagrams showing the structure of the probe drive mechanism 101 shown in FIG. 1. FIG. 2A is an XY plan view of the probe drive mechanism 101. FIG. 2B is a cross sectional view of the probe drive mechanism 101 taken along the line A-A' as indicated by the arrows. FIG. 2C is a YZ plan view of the probe drive mechanism 101. The probe drive mechanism 101 is configured so that holders 201, 202 and a Y stage 203 are integrally formed within the same plane through the intermediary of elastic deformation sections 204a, 204b, 204c and 204d. Further, on the same plane of a Y stage 203, an X stage 207 is integrally formed and orthogonally to the Y stage 203 through the intermediary of elastic deformation sections 208a, 208b, 208c and 208d. The X stage 207 is provided with a through hole 211 for the objective lens 106 to pass through. Layered piezoelectric elements (hereafter referred to simply as piezoelectric elements throughout the embodiment) 205 and 206 are bonded between the holder 201/202 and the Y stage 203. The piezoelectric elements 205 and 206 simultaneously and equivalently extend or contract to move the Y stage 203 in the Y-axis direction. The piezoelectric element 205 and elastic deformation sections 204a and 204b configure a drive mechanism. The piezoelectric element 206 and elastic deformation sections 204c and 204d configure a drive mechanism. The drive mechanisms are paired and are symmetrically positioned around a visual field center 212 (the tip of the probe 102) of the objective lens.

A general piezoelectric element (piezoceramic element) changes its length when a direct-current voltage is applied. A layered piezoelectric element includes a layer of an electrode and a thin piezoelectric element and is often used so as to cause a large displacement using a small voltage. An example layered piezoelectric element 40 mm long extends 20 micrometers when a voltage of 100 V is applied. When voltage noise is approximately 5 mV, such piezoelectric element ensures the resolution equivalent to the movable distance multiplied by a ratio between the nose and the maximum applied voltage. The resolution is one nanometer. A configuration for providing subnanometer resolution will be described later.

Piezoelectric elements 209 and 210 are bonded between the Y stage 203 and the X stage 207. The piezoelectric elements 209 and 210 simultaneously and equivalently extend or contract to move the X stage 207 in the X-axis direction. The piezoelectric element 209 and elastic deformation sections 208a and 208b configure a drive mechanism. The piezoelectric element 210 and elastic deformation sections 208c and 208d configure a drive mechanism. The drive mechanisms are paired and are symmetrically positioned around a visual field center 212 (the tip of the probe 102) of the objective lens. The piezoelectric elements 209 and 210 also provide the maximum movable distance of 20 micrometers and the movable resolution of one nanometer.

A Z-axis mechanical section 213 is attached to the bottom of the X stage 207 so as to be orthogonal to movable planes of the Y stage 203 and the X stage 207. The Z-axis mechanical section 213 includes stationary sections 218 and 219 and a Z stage 214 that are integrally formed within the same plane through the intermediary of elastic deformation sections 215a, 215b, 215c, and 215d. Piezoelectric elements 216 and 217 are bonded between the stationary section 218/219 and the Z stage 214. The piezoelectric elements 216 and 217 simultaneously and equivalently extend or contract to move the X stage 214 in the Z-axis direction. The piezoelectric element 216 and elastic deformation sections 215a and 215b configure a drive mechanism. The piezoelectric element 217 and elastic deformation sections 215c and 215d configure a drive mechanism. The drive mechanisms are paired and are symmetrically positioned with reference to an optical axis 212' of the objective lens on the XZ plane. The piezoelectric elements 216 and 217 provide the maximum movable distance of 10 micrometers and the movable resolution of one nanometer. The probe 102 is attached to the Z stage 214 through the intermediary of the probe holder 115. The tip position of the probe 102 corresponds to the visual field center 212 of the objective lens.

As mentioned above, the probe drive mechanism 101 according to the invention is configured so that the X stage 207, the Y stage 203, and the Z stage 214 for three-dimensionally driving the probe 102 independently operate without interfering with each other. For example, the Y stage 203 provides a set of stage drive mechanical section while the piezoelectric element 205 is sandwiched between two elastic deformation sections 204a and 204b placed along an extended line for an extension/contraction axis of the piezoelectric element 205. Similarly, the piezoelectric element 206 and the elastic deformation sections 204c and 204d provide another set of stage drive mechanical section. These stage drive mechanical sections are provided on both sides of the Y stage 203. The piezoelectric elements 205 and 206 equivalently extend and contract to be able to uniformly deform all the elastic deformation sections 204a, 204b, 204c, and 204d. As a result, an Abbe error is eliminated from the Y stage 203. The straightness of the Y stage 203 can be improved much more than conventional technologies. Obviously, the operating principle is also applicable to the X stage 207 and the Z stage 214. A probe drive control section 110 controls operations of the X stage 207, the Y stage 203, and the Z stage 214 of the probe drive mechanism 101.

Layered piezoelectric elements may cause individual differences in extension and contraction displacements when a voltage is applied. Even the same piezoelectric element necessitates hysteresis characteristics between the applied electric potential and the displacement. A possible solution in this case is to previously measure hysteresis characteristics and apply a voltage for the targeted displacement by adjusting the voltage corresponding to each of the piezoelectric elements. The embodiment uses piezoelectric elements for operating the X stage 207, the Y stage 203, and the Z stage 214 of the probe drive mechanism 101. The power source for each stage is not limited to the piezoelectric element and may use a linear actuator capable of enough accuracy and generative force to position the probe 102. Constituent materials for the probe drive mechanism 101 include aluminum alloy or titanium characterized by a large ratio between rigidity and specific gravity and iron-nickel alloy characterized by a small coefficient of thermal expansion (linear expansion coefficient).

The observational optical system lens tube 105 and the objective lens 106 are placed above the probe drive mechanism 101 and are capable of vertical movement in the Z-axis direction by means of the movement mechanism (not shown). The objective lens 106 is inserted into the through hole 211 provided for the X stage 207 so as not to touch the probe drive mechanism 101. The probe drive mechanism 101 according to the invention eliminates a mechanical section above the probe 102 for the probe 102 to scan. The objective lens 106 can not only directly observe the probe 102 but also observe the surface of the specimen 103 at high resolution. For example, let us suppose that the objective lens 106 indicates the aperture ratio of 0.7 and the operating distance of six millimeters. Then, the objective lens 106 can clearly observe a pattern on the specimen 103 at the resolution of one micrometer or less. While the position of the probe 102 is fixed, the objective lens 106 and the specimen stage 104 may be lowered equivalently (e.g., one millimeter) so that the objective lens 106 does not touch the probe 102. It is possible to observe a pattern on the specimen 103 just below the probe 102 with no influence of the probe 102 placed in the visual field for the objective lens 106. This technique uses the optical phenomenon available under the condition that the objective lens 106 has a large aperture ratio and the probe 102 occupies only a part of the visual field for the objective lens 106.

FIG. 3 is an XZ plan view of the probe drive mechanism 101 which shows the configuration of a probe deflection detection section for detecting contact between the probe 102 and the surface of the specimen 103. Reference numeral 301 denotes a laser diode having the oscillation wavelength of 600 nanometers and the oscillation output of 0.1 milliwatts. The laser diode 301 radiates a laser beam that is collimated through a collimation lens 302 and then is reflected on a mirror 303 (not shown) attached to the holder 201 in the Y-axis direction. The laser beam is again reflected on a mirror 304 (not shown) attached to the Y-stage 203 in the X-axis direction, further reflected on mirrors 305 and 306, and then is radiated to the rear of the probe 102. The laser beam is reflected on the rear of the probe 102 and is reflected on mirrors 307 and 308. The laser beam is reflected on a mirror 309 (not shown) attached to the Y stage 203 in the Y-axis direction. The laser beam is again reflected on a mirror 310 (not shown) attached to the holder 202 in the X-axis direction and is applied to a light receiver 311. The laser diode 301 is fixed to the holder 201 of the probe drive mechanism 101. The light receiver 311 is fixed to the holder 202. The mirrors 305, 306, 307, and 308 are fixed to the Z stage 214 using jigs (not shown). The amount of probe deflection can be detected as a change in the laser radiation position on a laser receiving surface of the light receiver 311 independently of positions of the probe 102.

The light receiver 311 is interchangeable with a PSD (position sensitive device), an image sensor, or a 2-split or 4-split photodiode. When the probe 102 is deflected in contact with the specimen 103, the laser radiation position moves in the Y-axis direction on the light receiving surface of the light receiver 311. The light receiver 311 converts the change of the laser radiation position into a voltage signal. The probe deflection detection section 109 detects the contact between the probe 102 and the surface of the specimen 103. When the probe holder 115 or the like oscillates the probe 102, the probe deflection detection section may be configured to detect the oscillation amplitude or phase of a probe deflection signal caused by the deflection of the probe 102. It may be preferable to detect a force acting between the probe 102 and the specimen 103. That is, a force generated between the probe tip and the specimen changes when the tip of the oscillating probe approaches the specimen. The force changes oscillation states such as an oscillation phase and a vibrational frequency in accordance with the oscillation amplitude and the oscillation signal. Detecting the oscillation states can measure the force.

Figure 4B:
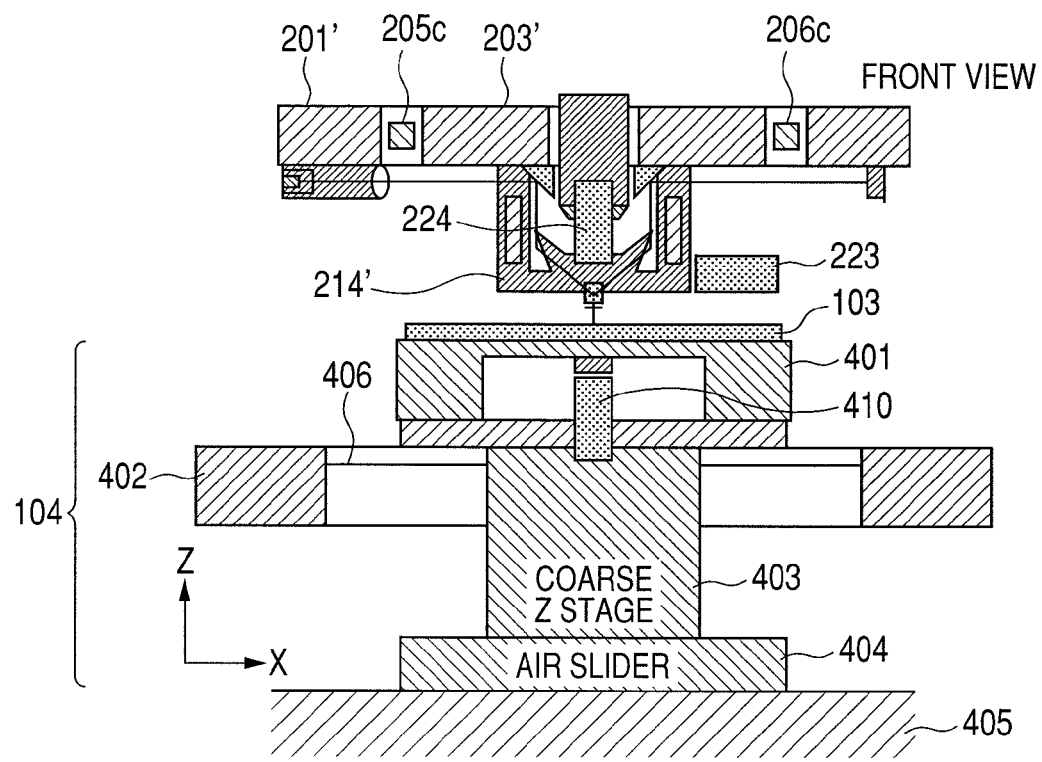
FIG. 4B is an elevational view showing the approximate configuration of the probe driving section in the scanning probe microscope.

With reference to FIGS. 4A and 4B, the following describes the configuration of a wide-range, high-speed, high-precision SPM using a coarse/fine adjustment mechanism, a responsiveness switch mechanism, and a displacement meter according to the invention.

The probe position measurement in the Z direction will be described. Part of the probe holder 115 is configured to face toward a Z-axis capacitance sensor 224 that is fixed to at least one of holders 201' and 202 or an X stage 207' by means of a mechanical section (not shown). A gap of 20 micrometers is provided between facing surfaces of the probe holder 115 and the capacitance sensor 224. The Z-axis capacitance sensor 224 used in this example is capable of measuring the gap to the probe holder 115 at the resolution of 0.1 nanometers and measures a travel distance of the Z stage 214'. The probe holder 115 and the Z-axis capacitance sensor 224 are provided along the Z axis that overlaps with the optical axis 212' of the objective lens on the XZ plane.

The configuration is capable of measuring a stage displacement at the visual field center 212 of the objective lens, i.e., a displacement at the tip of the probe 102, and causes little Abbe error even when a yawing error occurs in the operation of the Z stage 214'. The probe holder 115 is made of a metal material capable of electric conduction with a metal material of the Z stage 214'. Precision grinding is applied to the surface of the probe holder 115 against the Z-axis capacitance sensor 224. The accuracy and the resolution of SPM measurement can be more improved by replacing the capacitance sensor with a laser interference displacement meter (described later) or an equivalent sensor with higher precision that ensures the resolution of approximately ten picometers.

The configuration on the side of the specimen 103 can be seen from the embodiment shown in FIGS. 4A and 4B. A coarse Z stage 403 is mounted on an air slider 404. A specimen-side XY stage 401 is mounted on the coarse Z stage 403. The specimen 103 is mounted on the specimen-side XY stage 401. The air slider 404 is coupled with the coarse Z stage 403 by means of a coarse XY stage 402 and an elastic plate 406. The air slider 404 is placed on a surface plate 405. The coarse XY stage 402 is fixed to the surface plate 405 by means of a structure (not shown). To select an observation position on the specimen 103, the coarse XY stage 402 moves the air slider 404 via the elastic plate 406 in the XY plane. This configuration ensures a lower height and higher rigidity during rest than a conventional technology of stacked X, Y, and Z stages. The configuration can therefore almost eliminate oscillation of the specimen 103 and is optimal for the scanning probe microscope. To move the coarse XY stage 402, air may be injected in between the air slider 404 and the surface plate 405 for decreasing a frictional force. Alternatively, the coarse XY stage 402 may be slid against the surface plate 405 without applying air to the air slider 404. This method causes no air gap and is particularly effective when the probe 102 measures a wide area ranging from several hundreds of micrometers to several tens of millimeters on the specimen. The probe 102 can measure a surface shape of the specimen 103 while the air slider 404 slides on the flat surface plate 405.

The specimen-side XY stage 401 is driven when the probe 102 measures an intermediate region ranging from several tens to hundreds of micrometers on the specimen 103. The specimen-side XY stage 401 is driven by a piezoelectric element and is structured similarly to the probe-side stage using the elastic guide. The specimen-side XY stage 401 does not have a stage equivalent to a stage movable along the Z axis 214' of the probe-side stage. On the other hand, the specimen-side XY stage 401 can be designed so as to place more importance on a range of movement than on rigidity needed for high-speed scanning of the probe. The specimen-side XY stage 401 provides a wide range of movement such as several hundreds of micrometers.

It is difficult to scan a wide range by ensuring high flatness. A displacement sensor 410 such as a capacitance sensor or a laser interference/displacement meter is used to measure vertical movement of the specimen-side XY stage 401 during scanning. The measurement can ensure higher flatness by correcting height data at points in the measurement result from the scanning probe microscope. For example, let us suppose that the specimen-side XY stage 401 ensures the flatness of 10 nanometers during scanning. When the displacement sensor 410 provides the accuracy of 0.1 nanometers, the above-mentioned correction can improve the flatness measurement accuracy from 10 nanometers to 0.1 nanometers in measurement results from the scanning probe microscope.

While the displacement sensor 410 corrects a measurement result as mentioned above, the measurement result may be directly fed back to the Z stage 214' and the height of the probe 102 may be corrected so as to follow vertical movement of the specimen-side XY stage 401 during scanning over the specimen 103.

The following describes measurement of probe positions in the X and Y directions. A mechanical section (not shown) fixes an X-axis capacitance sensor 223 and a Y-axis capacitance sensor 222 to at least one of the holders 201' and 202'. The X-axis capacitance sensor 223 and the Y-axis capacitance sensor 222 face against the tip of the Z stage 214'. Precision grinding is applied to the surfaces against the Z stage. The X-axis capacitance sensor 223 and the Y-axis capacitance sensor 222 are respectively disposed along the X axis and the Y axis in the XY plane including the visual field center 212 (the tip of the probe 102) of the objective lens. The disposition makes it possible to measure a stage displacement at the visual field center 212 of the objective lens, i.e., a displacement at the tip of the probe 102, and causes little Abbe error despite a yawing or pitching error contained in operations of the X and Y stages that mount the Z stage 214'.

Displacement meter outputs are used for feedback control so as to accurately control the probe tip position for scanning. The high-precision SPM can measure shapes and dimensions of a specimen. The accuracy and the resolution of SPM measurement can be more improved by replacing the capacitance sensor with a laser interference displacement meter (described later) or an equivalent sensor with higher precision that ensures the resolution of approximately ten picometers.

The following configuration is used to provide high-speed measurement in a wide range and high-precision measurement in a narrow range. The configuration uses a coarse/fine adjustment mechanism including 205a, 205b, and 205c in FIGS. 4A and 4B instead of the piezoelectric element 205 as shown in FIGS. 2A through 2C. Piezoelectric elements 206, 209, and 210 are fully interchangeable with the piezoelectric element 205. Therefore only the piezoelectric element 205 will be described. (In terms of the piezoelectric elements 209 and 210, the Y stage 203 is interchangeable with the X stage 207 and the Y displacement sensor 222 is interchangeable with the Y displacement sensor 223.) Reference numeral 205a denotes a piezoelectric element included in the coarse adjustment mechanism. The piezoelectric element 205a is connected to a displacement enlarging mechanism 205b. The displacement enlarging mechanism 205b provides a lever that is fixed to the holder 201 at one end, is pressed by the piezoelectric element 205a at a midway point, and is connected to a fine adjustment piezoelectric element 205c at the other end.

The displacement of the piezoelectric element 205a is enlarged by a lever magnification factor and is transmitted to the piezoelectric element 205c. The lever magnification factor is equivalent to a ratio of the distance between the fixed part of 205b and a junction to the piezoelectric element 205c to the distance between the fixed part thereof and a junction to the piezoelectric element 205a. For example, let us suppose that the lever magnification factor is 5 and the piezoelectric element 205a extends 20 micrometers. Then, one end of the piezoelectric element 205c is displaced 100 micrometers. The piezoelectric element 205c transmits the displacement to the Y stage 204 to displace the Y stage. A displacement enlarging mechanism including piezoelectric elements 206a, 206b, and 206c similarly transmits the displacement to the Y stage 204. As mentioned above, the piezoelectric elements 205a and 206a may be assumed to provide the displacement resolution of one nanometer. In this case, displacement noise transmitted to the stage 204 is enlarged five times to be five nanometers.

In FIG. 2A, the piezoelectric elements 204a through 204d, 205c, and 206c are used for fine adjustment. These piezoelectric elements are conditioned to extend approximately one micrometer when a voltage of 100 V is applied. Displacements of the fine adjustment piezoelectric elements are added to displace the Y stage. Voltage noise of 5 mV causes the fine adjustment piezoelectric element to generate noise of 50 picometers. There may be a case where the fine adjustment piezoelectric element 204a through 204d, 205c, or 207c responds earlier than the coarse adjustment piezoelectric element 206, 206, 205a, or 207a. In this case, the displacement sensor 222 detects the Y direction position of the Y stage 203 or 203' and supplies a feedback. This makes it possible to control the Y stage 203 or 203' at the same level of resolution as for the displacement sensor. The feedback control will be described later with reference to FIGS. 15A and 15B. During the feedback control, a probe scan control section 112 processes stage displacement data detected by a stage displacement detection section 128. The probe drive control section 110 accordingly drives the piezoelectric elements. The probe drive control section 110 contains a coarse adjustment piezoelectric element driver 500 and a fine adjustment piezoelectric element driver 510 corresponding to the axes.

Figure 5A:
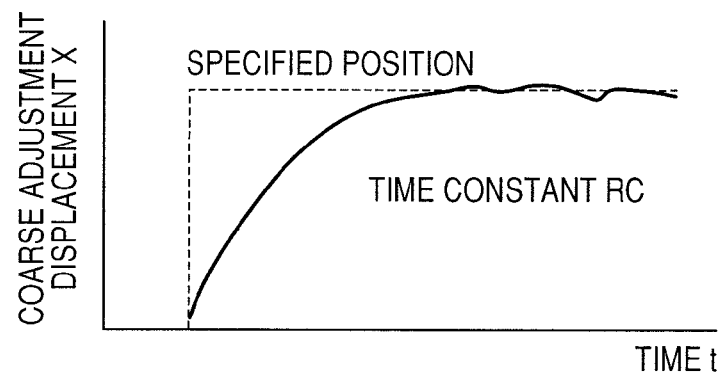
FIG. 5A is a graph showing a time change in coarse adjustment displacement of a piezoelectric element driver in a conventional scanning probe microscope, where a small time constant is used.
Figure 5B:
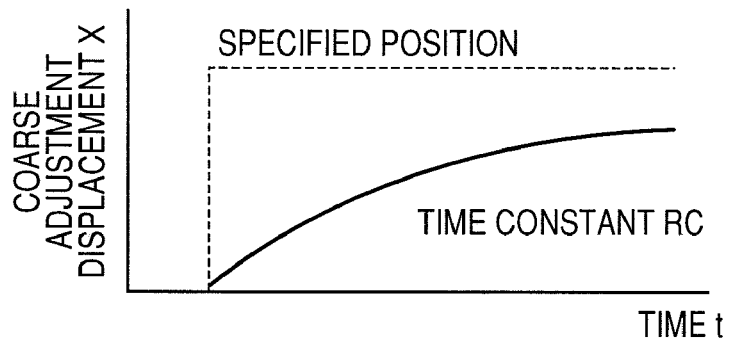
FIG. 5B is a graph showing a time change in coarse adjustment displacement of the piezoelectric element driver in the scanning probe microscope, where a large time constant is used.

The fine adjustment piezoelectric element cannot cancel noise unless the responsiveness is sufficiently small on the coarse adjustment side. That is, the piezoelectric element is considered as an electrical load with capacitance C. Let us consider driving the piezoelectric element using a driver amplifier for the output resistor R. When the driver amplifier has large capacity and the output resistor R can be small, time constant RC decreases as shown in FIG. 5A to enable fast response to a specified position corresponding to the amplifier input. However, large noise is generated after the specified position is located. The fine adjustment piezoelectric element cannot sufficiently cancel the noise. As shown in FIG. 5B, increasing the output resistor value decreases noise but increases time constant RC instead. This significantly slows the response during positioning across a long distance the fine adjustment piezoelectric element cannot cover.

Figure 6A:
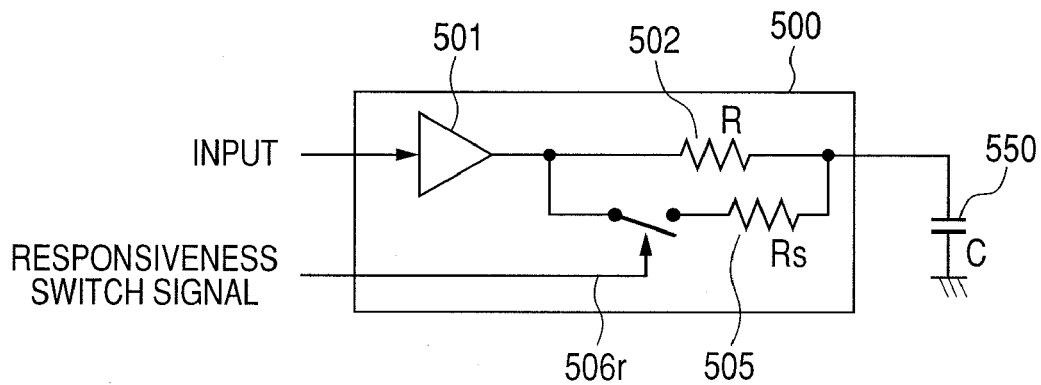
FIG. 6A shows a circuit configuration of a coarse adjustment piezoelectric element driver, where a responsiveness switch signal from outside switches high-speed drive output resistor Rs.

To solve this problem, the coarse adjustment piezoelectric element driver 500 is configured as shown in FIGS. 6A through 6F. A responsiveness switch mechanism is used to allow the coarse adjustment piezoelectric element to fast respond during positioning across a long distance. The responsiveness switch mechanism allows the coarse adjustment piezoelectric element to slowly respond during rest and uses the fine adjustment piezoelectric element for positioning. In FIG. 6A, a capacitor 550 with capacitance C represents a coarse adjustment piezoelectric element. An output from a driver amplifier 501 passes through an output resistor R (502) and is connected to a coarse adjustment piezoelectric element 550. The output resistor 502 is parallel connected to a high-speed drive output resistor Rs (505) through a switch 506r. In case that Rs is much smaller than R (Rs<<R)τ and the switch 506r is turned on, the output resistor is RsR/(Rs+R) ≈Rs and the piezoelectric element responds with high speed with time constant RsC. When the switch 506r is turned off, the piezoelectric element slowly responds with time constant RC in a mode for less noise. For positioning across a long distance, the switch 506r is turned on at first and then is turned off when the target point is approached. This enables both high-speed positioning and stability during rest.

Figure 6B:
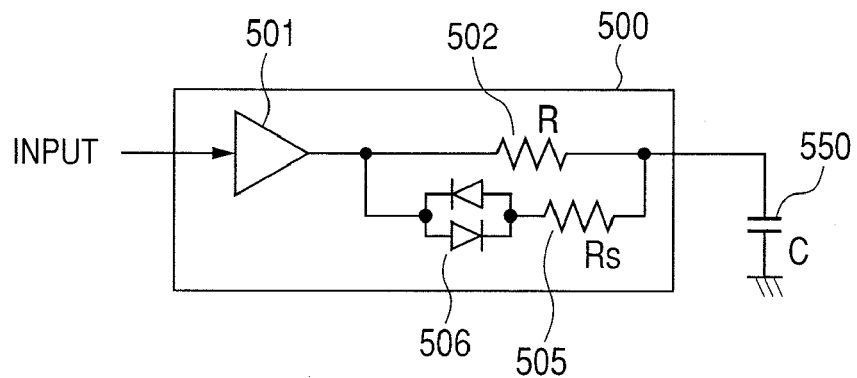
FIG. 6B shows a circuit configuration of a coarse adjustment piezoelectric element driver, where a pair of reversed diodes are inserted to automatically switch high-speed drive output resistor Rs.
Figure 6C:
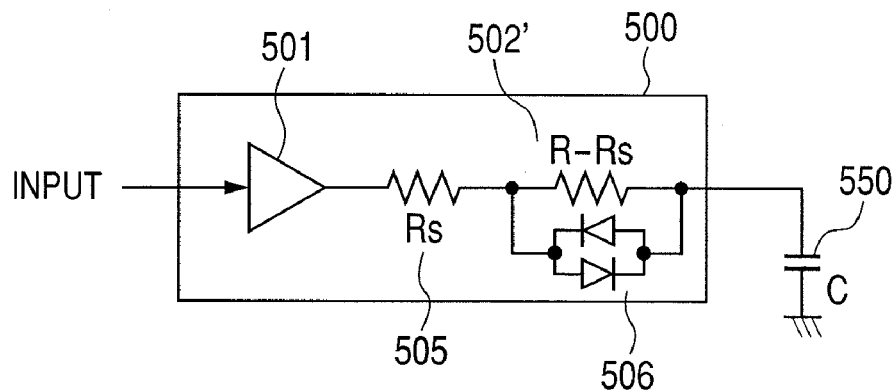
FIG. 6C shows a circuit configuration of a coarse adjustment piezoelectric element driver, where a pair of reversed diodes are inserted and divided resistors are inserted to automatically switch high-speed drive output resistor Rs.

While the switch is explicitly operated according to the embodiment in FIG. 6A, the switch can also be operated automatically. As shown in FIG. 6B, the switch 506r is replaced by a switch 506 with diodes connected inversely and in parallel. Let us suppose that the diodes indicate forward voltage drop Vd. The diodes turn on when a current flowing through the output resistor 502 exceeds Vd/R. The current flows through the high-speed response resistor Rs to enable the fast response. When the voltage at both ends of the piezoelectric element 550 approaches the target value, the current decreases to turn off the switch 506 again. This causes decreasing the responsiveness and reducing noise instead. The configuration in FIG. 6C provides the same effect. An R-Rs resistor 502' and the resistor Rs (505) are serially connected to configure an output resistor. The resistor 502' is parallel connected to the switch 506 including the diodes as mentioned above. The diodes turn on when a current flowing through the resistor 502' exceeds Vd/(R-Rs). The current flows through the high-speed response resistor Rs to enable the fast response.

Figure 6D:
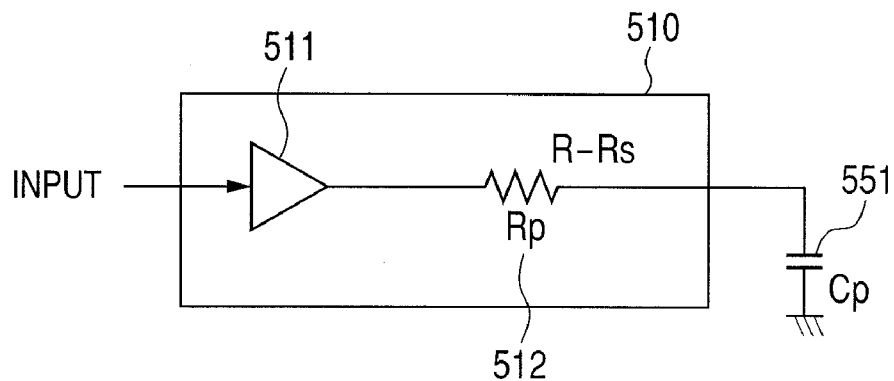
FIG. 6D shows a circuit configuration of a fine adjustment piezoelectric element driver.

As shown in FIG. 6D, the fine adjustment piezoelectric element driver 510 is configured so that a driver amplifier 511 is connected to a piezoelectric element 551 with capacitance Cp via an output resistor Rp (512). The value of the output resistor Rp so determined that time constant RpCp can ensure necessary responsiveness.

Figure 6E:
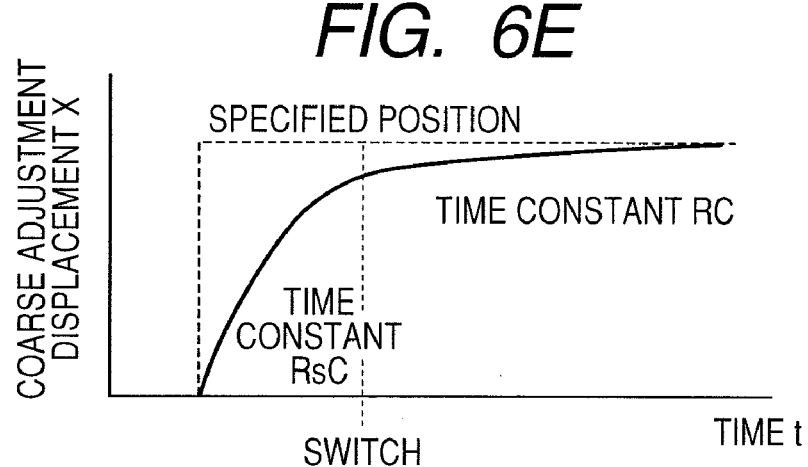
FIG. 6E is a graph showing a time change in coarse adjustment displacement in response to stepwise input.
Figure 6F:
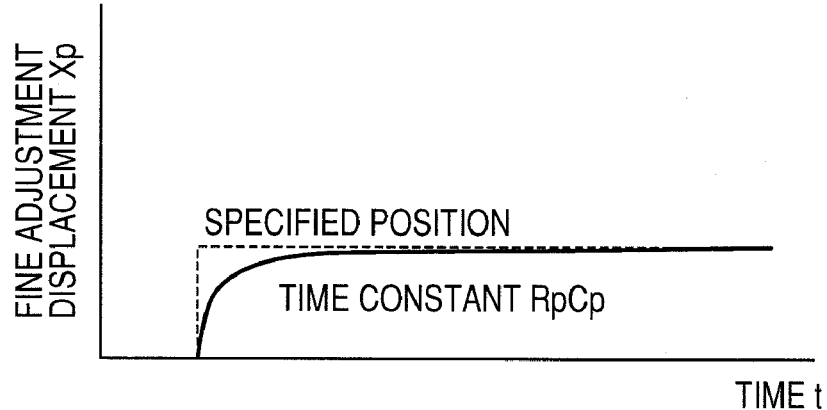
FIG. 6F is a graph showing a time change in fine adjustment displacement in response to stepwise input.

FIGS. 6E and 6F show displacement changes in accordance with a stepwise position input. As shown in FIG. 6E, coarse adjustment displacement X initially fast responds with time constant RsC. When a difference between the specified position and displacement X becomes small, the switch 506 or 506r decreases the response time constant to RC. The displacement X slowly changes with little displacement noise. As shown in FIG. 6F, fine adjustment displacement Xp fast changes with time constant RpCp. The range of movement is small. Even when a specified position exceeds the range, the displacement Xp changes within that range with small displacement noise.

Figure 7:
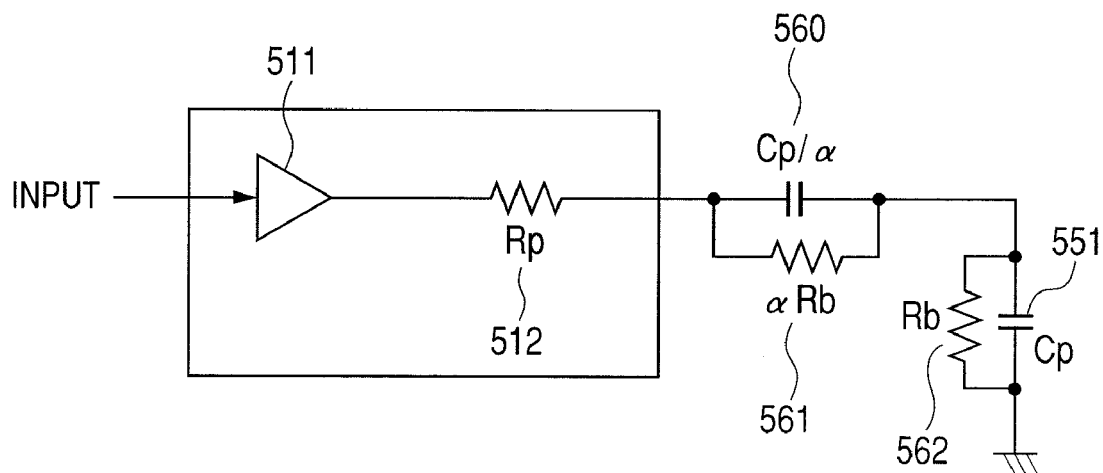
FIG. 7 shows an embodiment for further improving resolution of the fine adjustment piezoelectric element driver.

As shown in FIG. 7, capacitors are serially inserted between the fine adjustment piezoelectric element and the driver circuit. The voltage is divided by a ratio of reciprocals for capacitance values of the piezoelectric element and the capacitor to improve the noise, i.e., the displacement resolution of the fine adjustment piezoelectric element. In FIG. 7, the driver amplifier 511 drives the piezoelectric element 551 through an output resistor 512 (resistance value Rp) and a capacitor 560 with the capacitance equivalent to 1/α of capacitance Cp for the piezoelectric element 551. Voltages at both ends of the capacitors 560 and 551 are divided into a ratio of α to one. The noise is reduced to $1/(1+\alpha)$. Resistors αRb and Rb are provided parallel to the capacitors and indicate high resistance values at the level of megohms so that time constant RpCp can be sufficiently increased. The resistors prevent the voltage division ratio from varying gradually due to electric charge leak from the capacitors. When α is assumed to be 4, for example, the displacement resolution of the above-mentioned fine adjustment piezoelectric element is reduced to one fifth, from 50 picometers to 10 picometers. Instead, the range of movement for the fine adjustment piezoelectric element is decreased to one fifth, from one micrometer to 0.2 micrometers.

Figure 8A:
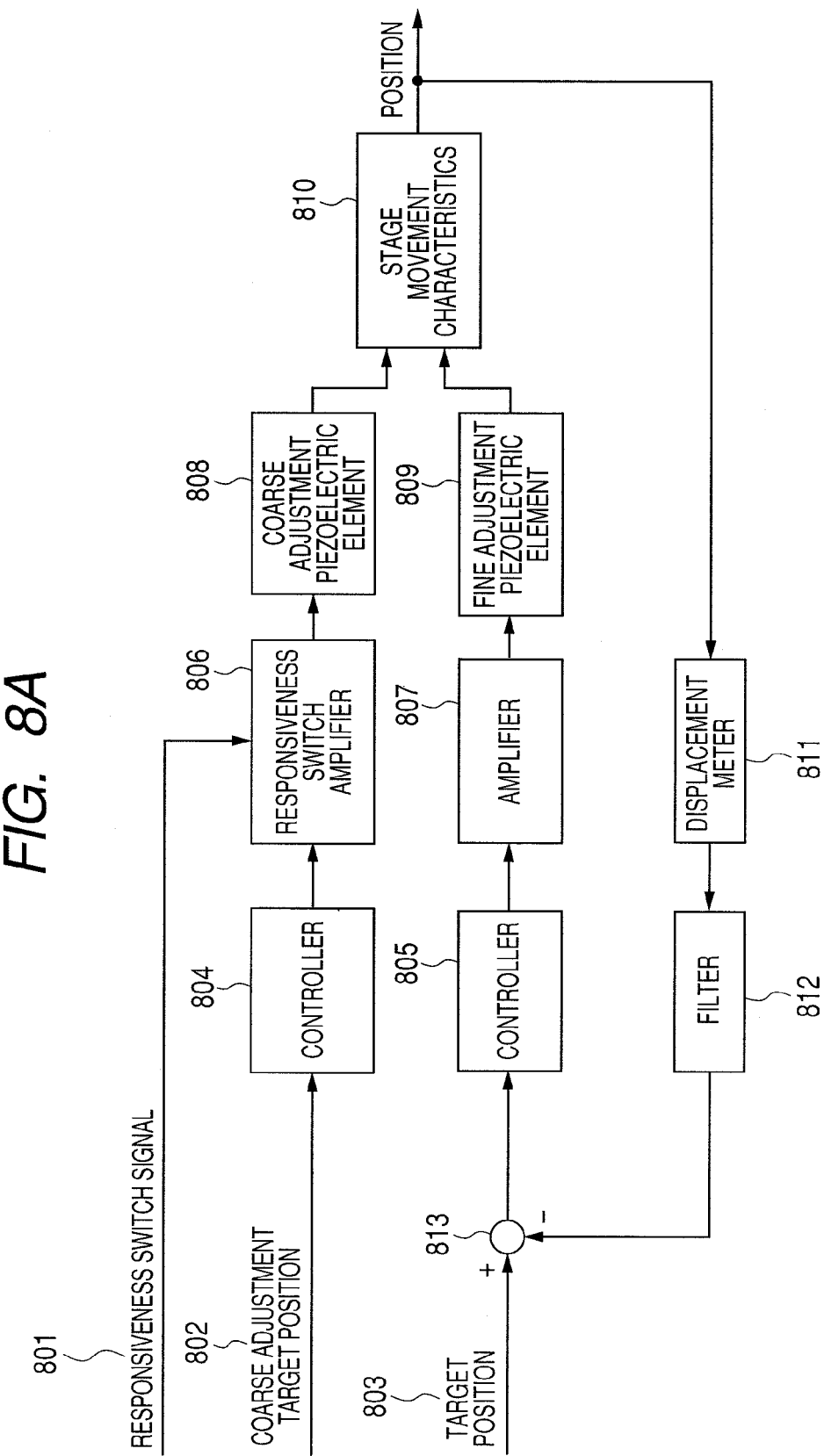
FIG. 8A is a control block diagram using a responsiveness switch amplifier and fine and coarse adjustment piezoelectric elements according to open control configuration.
Figure 8B:
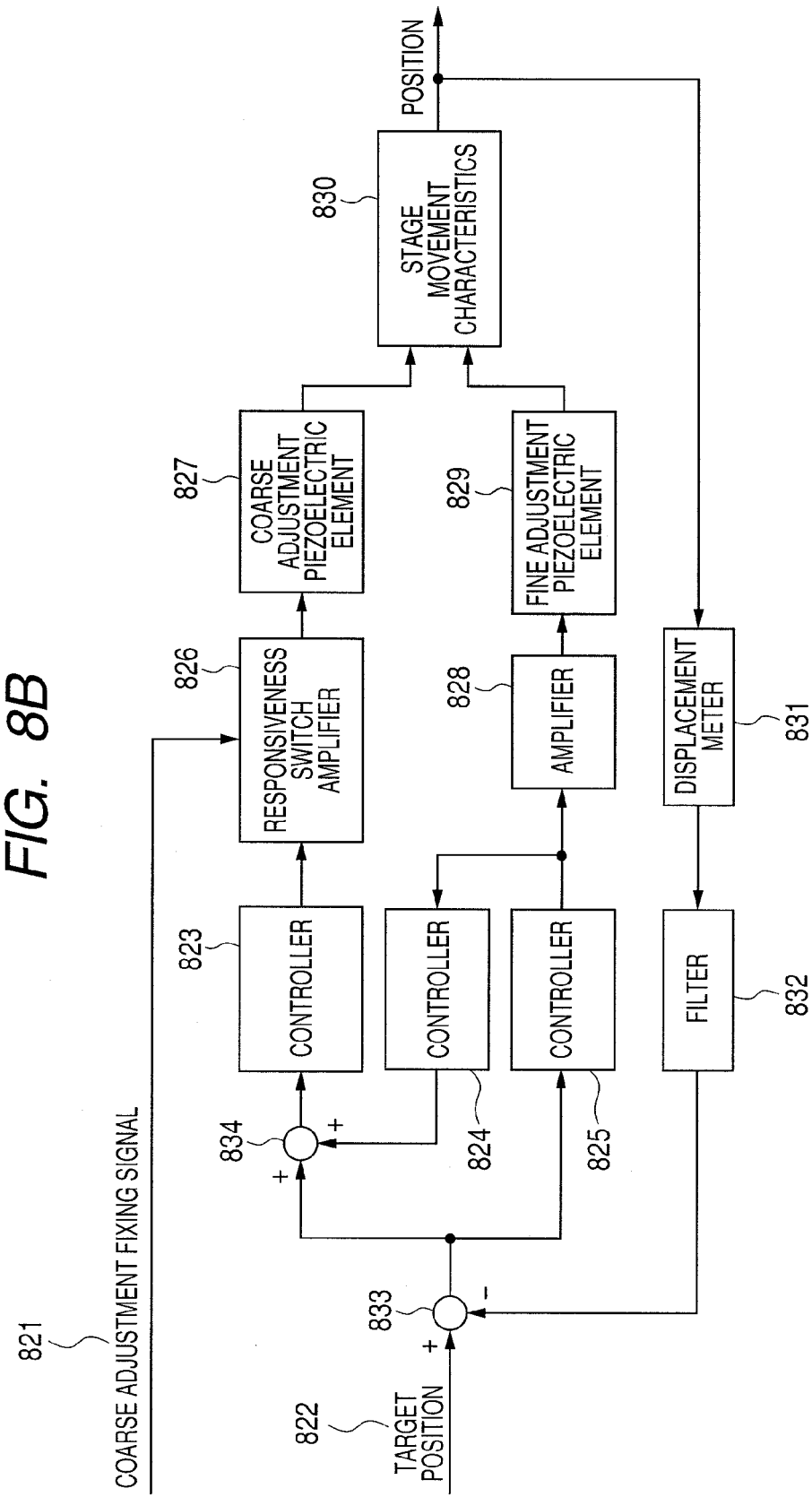
FIG. 8B is a control block diagram using a responsiveness switch amplifier and fine and coarse adjustment piezoelectric elements using a stage position detection signal that is filtered to reduce noise.
Figure 8C:
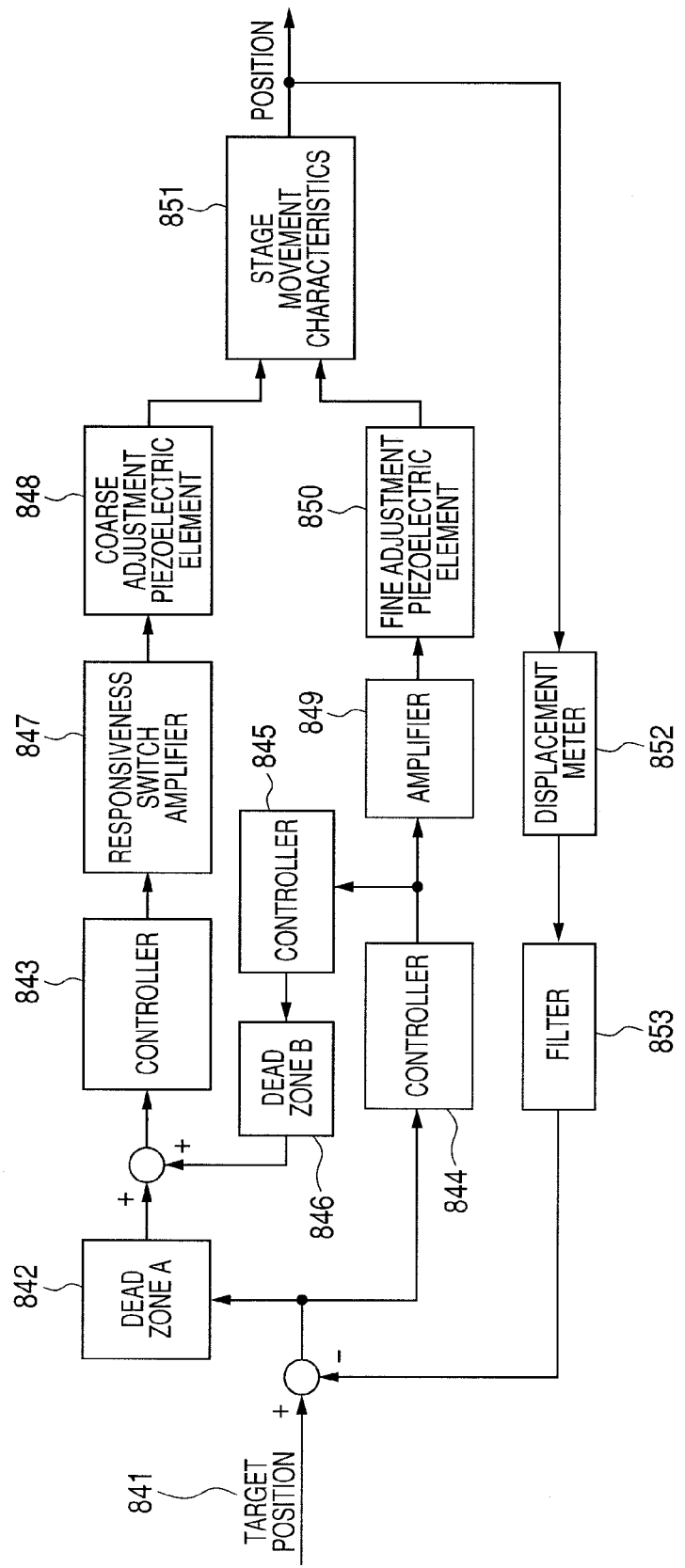
FIG. 8C is a control block diagram using a responsiveness switch amplifier and fine and coarse adjustment piezoelectric elements provided with a dead zone for control.

With reference to FIGS. 8A through 8C, the following describes operations of the probe scan control section 112 according to the invention. A coarse adjustment target position 802 is supplied under open control that does not feed back a measurement result from the displacement meter. After the coarse adjustment target position 802 is changed, a responsiveness switch signal 801 maintains the fast responsiveness for a responsiveness switch amplifier 806 until the response becomes stable. The responsiveness is thereafter changed to low speed (low noise). Obviously, the responsiveness may be automatically changed without supplying the responsiveness switch signal 801 from the outside. A displacement meter 811 detects a stage position. An appropriate filter 812 is applied to the output from the displacement meter 811 for decreasing noise. The stage position detected by the displacement meter 811 is compared (813) to a target position 803. A difference between the detected stage position and the target position is transmitted to an amplifier 807 via a controller 805 so as to control a fine adjustment piezoelectric element 809 based on feedback. The controller in this example is generally used for the control theory and applies an appropriate filter to an input that is then multiplied by a gain for output. For example, a PID controller multiplies an original input, its integrated value, and a differentiated value by gains respectively different with each other and outputs a sum thereof. The above-mentioned configuration can ensure both wide-range fast response and high-precision positioning.

FIG. 8B shows another configuration. A stage detection position 831 passes through a filter 832 to reduce noise. The detected position is then compared (833) to a target position 822. A positional error passes through controllers 823 and 825 for coarse adjustment and fine adjustment. The positional error for coarse adjustment passes through a responsiveness switch amplifier 826 to drive a coarse adjustment piezoelectric element 827. The positional error for fine adjustment passes through a normal amplifier 828 to drive a fine adjustment piezoelectric element 829. The input to the fine adjustment amplifier 828 passes through another controller 824 and is added to the control amount for the coarse adjustment piezoelectric element 827. This controller requires many integration operations. The fine adjustment piezoelectric element 829 may averagely continue to extend for a long period. This condition is added to the control amount for the coarse adjustment piezoelectric element 827. The coarse adjustment piezoelectric element 827 extends. The fine adjustment piezoelectric element 829 contracts instead. This condition also applies when the extension and the contraction are reversed. Displacement of the coarse adjustment piezoelectric element can be automatically adjusted so that the fine adjustment piezoelectric element can be used at the center of operation range on the average. According to the embodiment in FIG. 8C, the responsiveness switch amplifier 847 can fix an output value using a coarse adjustment fixing signal. When the SPM is used within a scan range that the fine adjustment piezoelectric element can cover, the embodiment can explicitly stop operations of the coarse adjustment piezoelectric element so as to ensure positioning with decreased noise.

Figure 9A:
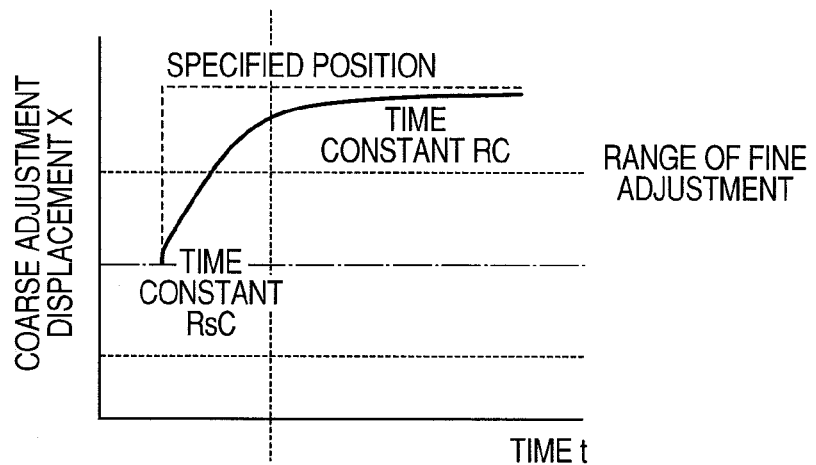
FIG. 9A is a graph showing a time change in coarse adjustment displacement when a specified position greatly changes stepwise.
Figure 9B:
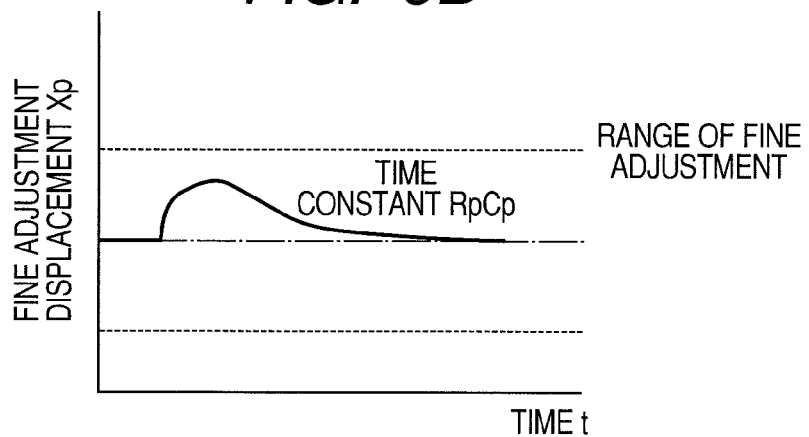
FIG. 9B is a graph showing a time change in fine adjustment displacement when a specified position greatly changes stepwise.
Figure 9C:
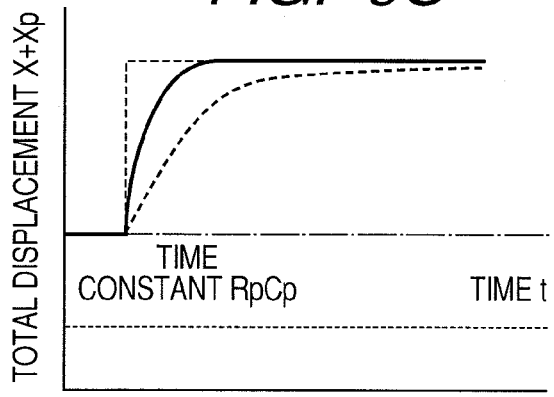
FIG. 9C is a graph showing a time change in total adjustment displacement when a specified position greatly changes stepwise.

Displacement states under this condition will be described with reference to FIGS. 9A through 9C. When the specified position changes stepwise significantly, a positional error is transmitted to the amplifier for the coarse adjustment piezoelectric element 848 and the amplifier for the fine adjustment piezoelectric element 850 via the corresponding controllers 843 and 844. A change is made to the coarse adjustment displacement in FIG. 9A and the fine adjustment displacement in FIG. 9B. When the specified position changes significantly, the coarse adjustment displacement in FIG. 9A fast responds and changes with time constant RsC. While fine adjustment displacement Xp in FIG. 9B changes fast, this state is added to an input to the amplifier for the coarse adjustment piezoelectric element via the controller. The displacement gradually moves to coarse adjustment displacement X. As total displacement X+Xp in FIG. 9C approaches the specified position, the fine adjustment displacement returns to zero (intermediate position) again. A dotted line illustrates the displacement using only the coarse adjustment piezoelectric element. Unlike this displacement, the total displacement contains the added fine adjustment displacement as illustrated by the solid line. Accordingly, the time constant fast changes in accordance with time constant RpCp for the fine adjustment displacement.

FIG. 8C shows still another configuration that completely stops operations of the coarse adjustment piezoelectric element during rest and further improves displacement noise without controlling the coarse adjustment fixing signal as described with reference to FIG. 8B. The configuration in FIG. 8C differs from that in FIG. 8B in that dead zones are provided. A dead zone A842 prevents a coarse adjustment piezoelectric element 848 from being driven when the positional error is within a specified range. For example, let us suppose that X denotes an input, Y denotes an output, and ±W denotes the dead zone. Then, the dead zone generates output expressed as: $Y=X+W(X<-W)$, $Y=0(-W<x<W)$, or $Y=X-W$ $(W<X)$. The dead zone is configured to be slightly smaller than the range of movement for a fine adjustment piezoelectric element 850. Accordingly, the coarse adjustment piezoelectric element 848 can be automatically driven only when the fine adjustment piezoelectric element 850 is incapable of positioning. A dead zone B846 is similarly configured. When the fine adjustment piezoelectric element 850 continues to be outside the center of the range of movement, a controller 845 previous to the dead zone B846 increases integration output to enable output from a dead zone B. The coarse adjustment piezoelectric element 848 can be driven only when the fine adjustment piezoelectric element continues to be outside the center of the range of movement.

Figure 10A:
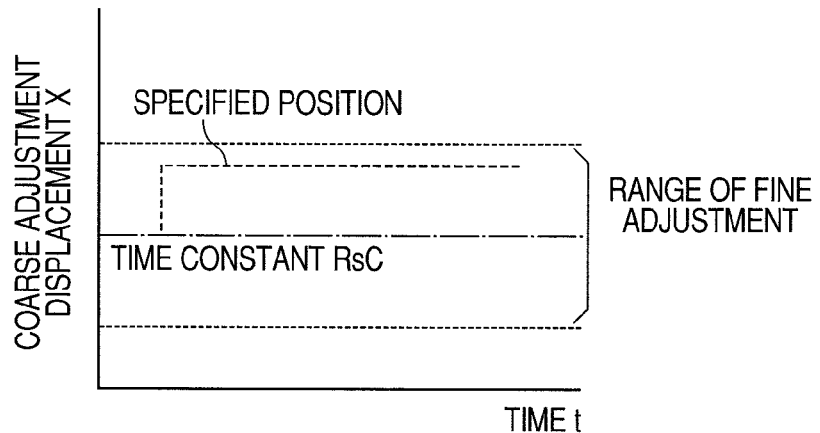
FIG. 10A is a graph showing a time change in coarse adjustment displacement when a specified position changes stepwise less than a dead zone level.
Figure 10B:
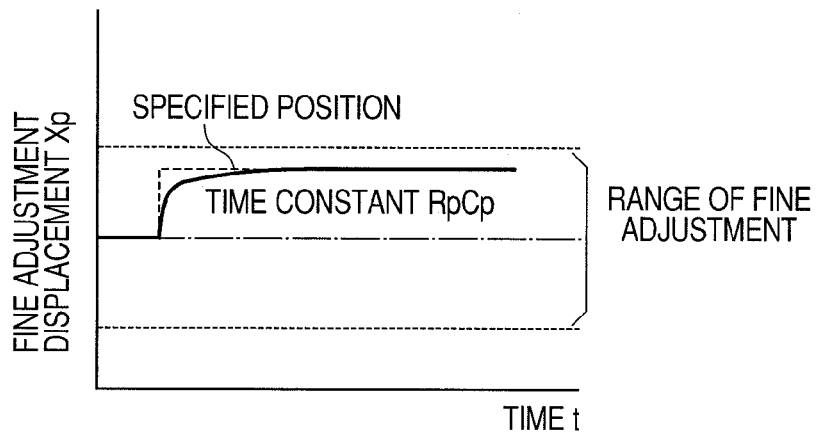
FIG. 10B is a graph showing a time change in fine adjustment displacement when a specified position changes stepwise less than a dead zone level.
Figure 10C:
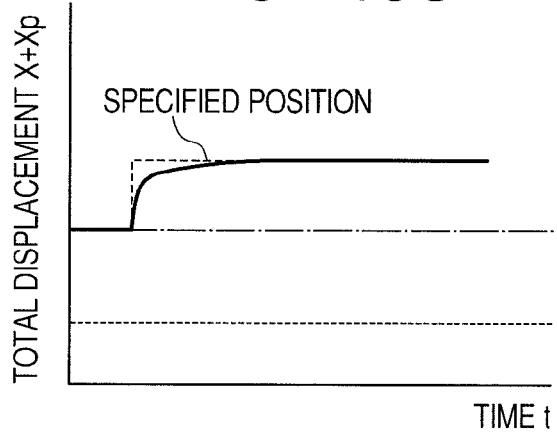
FIG. 10C is a graph showing a time change in total adjustment displacement when a specified position changes stepwise less than a dead zone level.

Displacement states under this condition will be described with reference to FIGS. 10A through 10C. As shown in FIG. 10A, a stepwise change at the specified position may be smaller than dead zone W settled in the range of fine adjustment. Alternatively, the coarse adjustment fixing signal may be explicitly turned on. In such case, coarse adjustment displacement X does not change. The positional error is transmitted to a piezoelectric element amplifier for fine adjustment whose signal path does not include the dead zones A and B. As shown in FIG. 10B, fine adjustment displacement Xp responds with time constant RpCp. As shown in FIG. 10C, the total displacement fast follows the specified position.

Figure 11A:
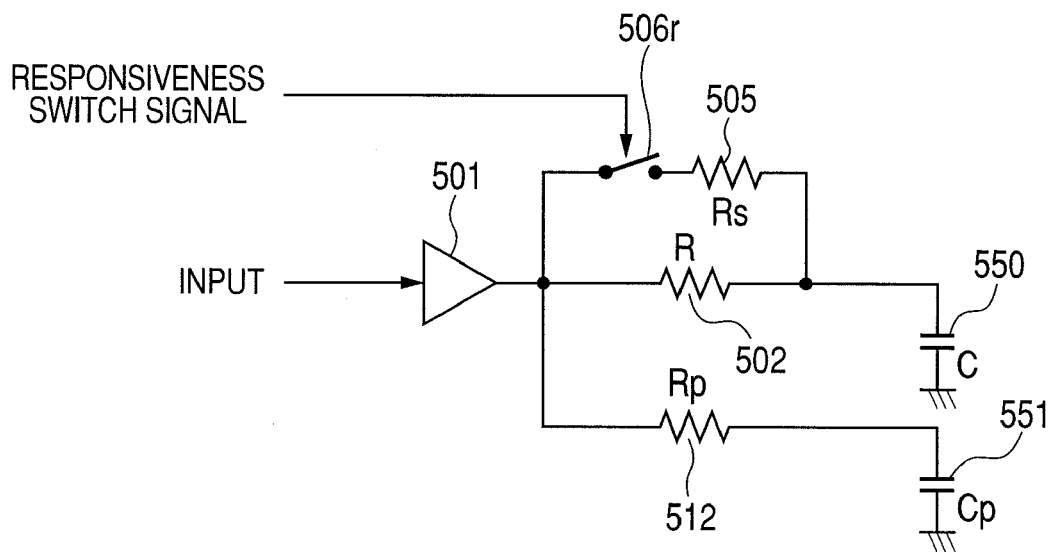
FIG. 11A is a circuit diagram showing the configuration that uses only one amplifier and switches between the coarse adjustment piezoelectric element and the fine adjustment piezoelectric element based on input from outside.

FIG. 11A shows yet another configuration that drives the coarse adjustment piezoelectric element 550 and the fine adjustment piezoelectric element 551 using only one amplifier. The driver amplifier 501 drives the fine adjustment piezoelectric element 551 via the output resistor Rp 512. The driver amplifier 501 is connected to the coarse adjustment piezoelectric element 550 via the output resistor R 502. The output resistor R 502 is parallel connected to the high-speed drive output resistor Rs 505 via the switch 506r. When the switch 506r is turned on under the condition of Rs<<R, the output resistor generates RsR/(Rs+R)≈Rs and the piezoelectric element fast responds with time constant RsC. When the switch 506r is turned off, the piezoelectric element slowly responds with responsiveness RC in a mode for little noise. For positioning across a long distance, the switch 506r is turned on and then is turned off when the target position is approached. This enables both high-speed positioning and stability during rest.

Figure 11B:
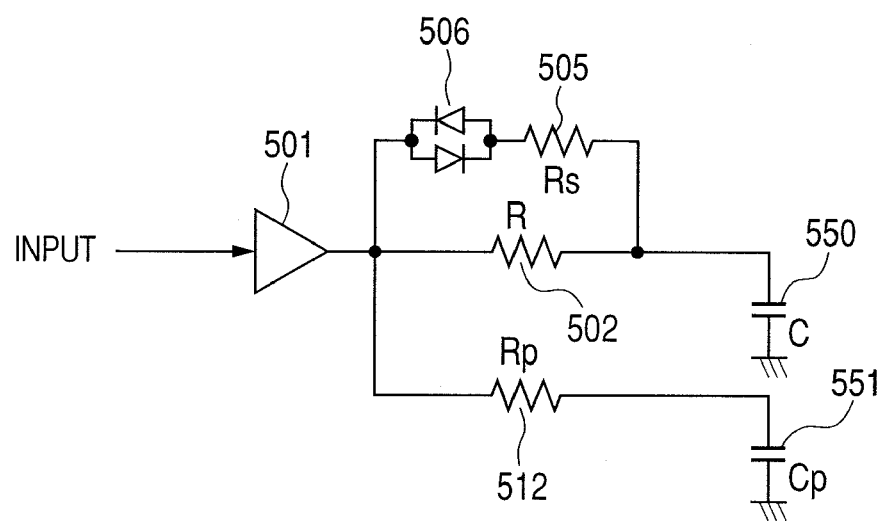
FIG. 11B is a circuit diagram showing the configuration that uses only one amplifier and automatically switches between the coarse adjustment piezoelectric element and the fine adjustment piezoelectric element.

While the switch is explicitly operated according to the embodiment in FIG. 11A, the switch can also be operated automatically. As shown in FIG. 11B, the switch 506r is replaced by the switch 506 with diodes connected inversely and in parallel. Let us suppose that the diodes indicate forward voltage drop Vd. The diodes turn on when a current flowing through the output resistor 502 exceeds Vd/R. The current flows through the high-speed response resistor Rs to enable the fast response. When the voltage at both ends of the piezoelectric element 550 approaches the target value, the current decreases to turn off the switch 506 again. The responsiveness decreases and noise is reduced instead. The fine adjustment piezoelectric element 551 automatically responds to small-movement positioning due to a difference in responsiveness between the coarse adjustment amplifier and the fine adjustment amplifier. The coarse adjustment piezoelectric element 550 and the fine adjustment piezoelectric element 551 simultaneously respond to large-movement positioning. The responsiveness of the coarse adjustment amplifier slows down in the vicinity of the target position. The fine adjustment piezoelectric element 551 responds to the rest.

Figure 12A:
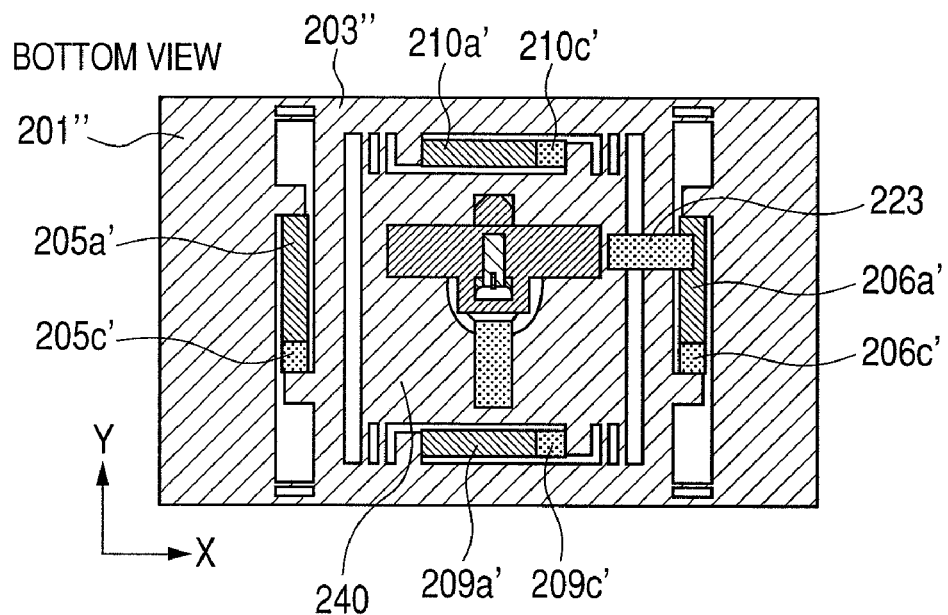
FIG. 12A is a plan view showing another example of the mechanism of driving the probe.
Figure 12B:
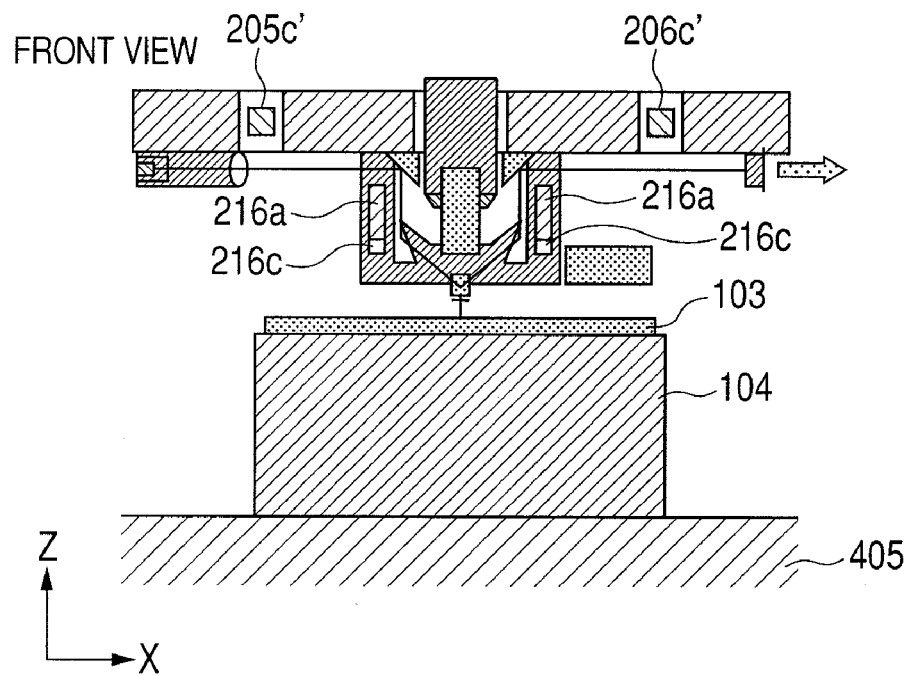
FIG. 12B is a elevational view showing another example of the mechanism of driving the probe.

FIGS. 12A and 12B show still yet another configuration that allows the probe 102 to fast scan in a wide range and accurately scan in a narrow range as described with reference to FIGS. 4A and 4B. The configuration in FIGS. 12A and 12B is almost the same as that in FIGS. 2A through 2C and only differences will be described. The piezoelectric elements 205 and 206 along the Y axis connect with coarse adjustment piezoelectric elements 205a' and 206a' and fine adjustment piezoelectric element 205c' and 206c', respectively. The configuration in FIGS. 12A and 12B increases the piezoelectric element length for the coarse adjustment while the configuration in FIGS. 4A and 4B increases the piezoelectric element displacement for the coarse adjustment. The same applies to the X axis. The piezoelectric elements 209 and 210 along the X axis connect with coarse adjustment piezoelectric elements 209a' and 210a' and fine adjustment piezoelectric element 209c' and 210c', respectively. The same applies to the Z axis. The piezoelectric elements 216 and 217 along the Z axis connect with coarse adjustment piezoelectric elements 216a and 217a and fine adjustment piezoelectric element 216c and 217c, respectively. A circuit equivalent to that described with reference to FIGS. 4A and 4B drives the piezoelectric elements to enable high-speed scanning in a wide range and high-precision scanning in a narrow range.

According to the embodiment, the specimen stage 104 is equivalent to an ordinary XYZ stage. Obviously, the use of the stage as described with reference to FIG. 4B further improves the accuracy.

Figure 13:
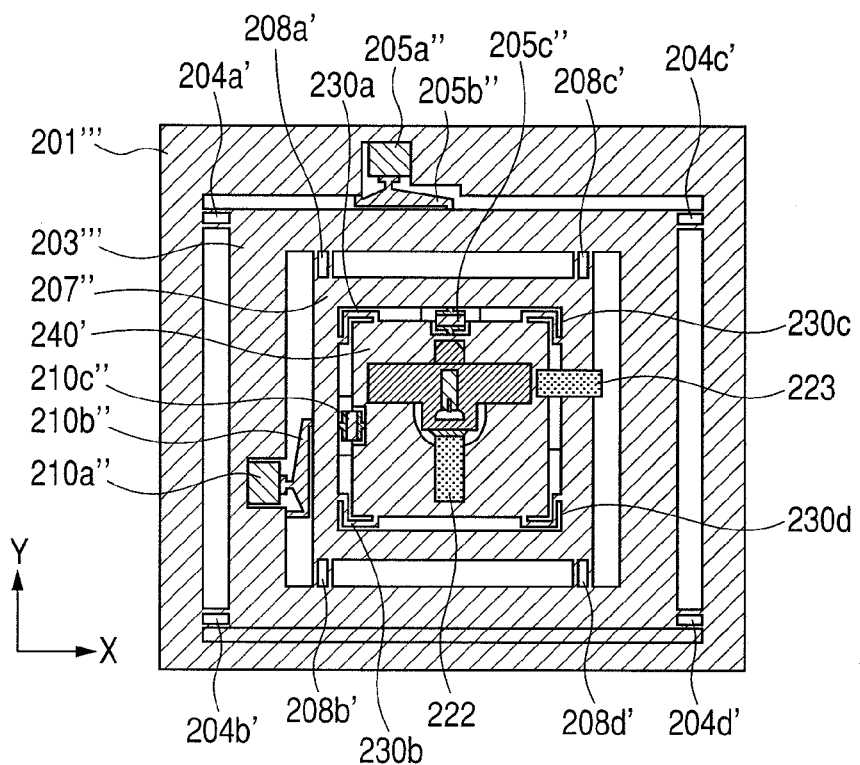
FIG. 13 is a plan view showing still another example of the mechanism of driving the probe.

FIG. 13 shows yet still another configuration that allows the probe 102 to fast scan in a wide range and accurately scan in a narrow range as described with reference to FIGS. 4A and 4B. A Y-axis coarse adjustment piezoelectric element 205a'' is fixed to a holder 201'''. The piezoelectric element 205a'' drives a Y stage 203''' through a displacement enlarging mechanism 205b'' according to the principle of leverage. The holder 201 supports the Y stage 203 so that the Y stage 203 can smoothly move only in the Y direction through elastic deformation sections 204a', 204b', 204c', and 204d'. An X coarse adjustment piezoelectric element 210a'' is fixed to the Y stage 203'''. The piezoelectric element 210a'' drives an X stage 207'' through a displacement enlarging mechanism 210b'' according to the principle of leverage. An X stage 204' is supported against the Y stage 203''' so as to smoothly move only in the X direction through elastic deformation sections 208a', 208b', 208c', and 208d'. Inside the X stage 270'', a fine adjustment stage 240' is supported so as to smoothly move only in the X and Y directions through elastic deformation sections 230a', 230b', 230c', and 230d'. The L-shaped elastic deformation sections 230a', 230b', 230c', and 230d' are smoothly and elastically deformed in the X and Y directions.

A fine adjustment X piezoelectric element 210c'' and a fine adjustment Y piezoelectric element 205c'' drive the fine adjustment stage 240' in the X and Y directions, respectively. The fine adjustment piezoelectric elements 210c'' and 205c'' are joined to the X stage 207'' and the fine adjustment stage 240' by means of an elastic hinge so as to transmit a force only in the extension/contraction direction of the piezoelectric elements. An X displacement meter 223 and a Y displacement meter 222 measure displacement of the probe 102 in the X and Y directions. A circuit equivalent to that described with reference to FIGS. 4A and 4B drives the piezoelectric elements to enable high-speed measurement in a wide range and high-precision measurement in a narrow range.

Figure 14:
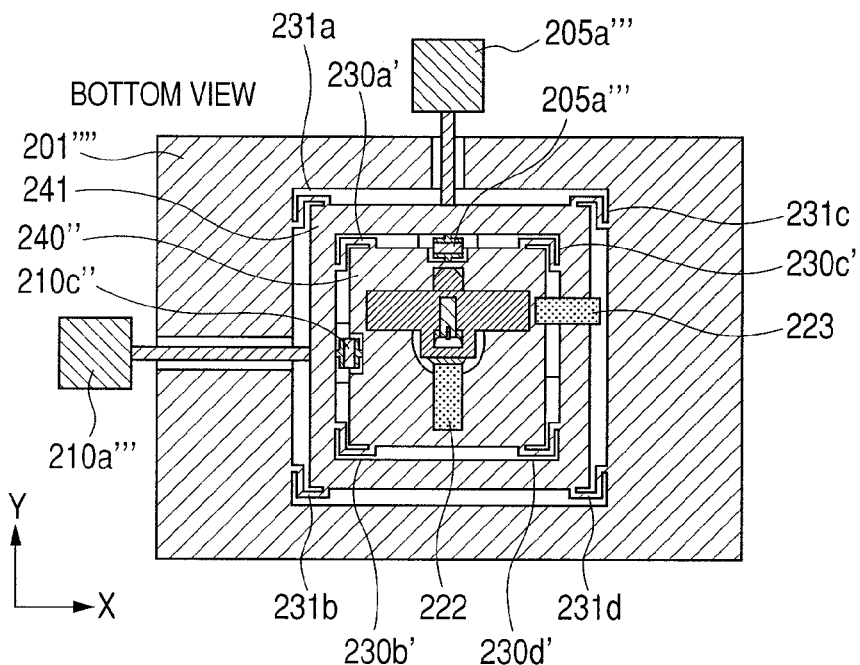
FIG. 14 is a plan view showing yet another example of the mechanism of driving the probe.

FIG. 14 shows still yet another configuration that allows the probe 102 to fast scan in a wide range and accurately scan in a narrow range as described with reference to FIGS. 4A and 4B. A holder 201'''' contains a coarse adjustment stage 241 so that the coarse adjustment stage 241 can smoothly move only in the X and Y directions through elastic deformation sections 231a, 231b, 231c, and 231d. An X coarse adjustment actuator 210a''' and a Y coarse adjustment actuator 205a''' are provided outside and drive the coarse adjustment stage 241 in the X and Y directions, respectively. The actuator may be replaced by a large piezoelectric element, a voice coil motor, a servo motor, a step motor, or an equivalent rotational drive transform mechanism using a rotary motor and a ball screw.

Inside the coarse adjustment stage 241, a fine adjustment stage 240'' is supported so as to smoothly move only in the X and Y directions through elastic deformation sections 230a', 230b', 230c', and 230d'. The L-shaped elastic deformation sections 230a', 230b', 230c', and 230d' are smoothly and elastically deformed in the X and Y directions. A fine adjustment X piezoelectric element 210c''' and a fine adjustment Y piezoelectric element 205c''' drive the fine adjustment stage 240'' in the X and Y directions, respectively. The fine adjustment piezoelectric elements 210c''' and 205c''' are joined to the coarse adjustment stage 241 and the fine adjustment stage 240'' by means of an elastic hinge so as to transmit a force only in the extension/contraction direction of the piezoelectric elements.

An X displacement meter 223 and a Y displacement meter 222 measure displacement of the probe 102 in the X and Y directions. A circuit equivalent to that described with reference to FIGS. 4A and 4B drives the piezoelectric elements to enable high-speed scanning in a wide range and high-precision scanning in a narrow range. It may be necessary to appropriately change the responsiveness or fix the coarse adjustment depending on types of the actuators 210a''' and 205a'''. For example, an electromagnetic brake is used to press a brake shoe (not shown) against a rod for pushing the coarse adjustment stage 241 so as to fix the coarse adjustment by means of a frictional force. Alternatively, a fluid damper (not shown) is attached to the rod for pushing the coarse adjustment stage 241 so that a flow channel through a damper orifice is reduced to decrease the responsiveness. Alternatively, an external coil is serially inserted between the coil of a voice coil motor and the driver amplifier. The fast response is enabled when a relay short-circuits both ends of the external coil. Opening the relay increases a current flowing through the coil, i.e., a response time constant for generative force of the voice coil motor in proportion to the percentage of an increase in the coil inductance. As a result, displacement noise decreases.

Figure 15A:
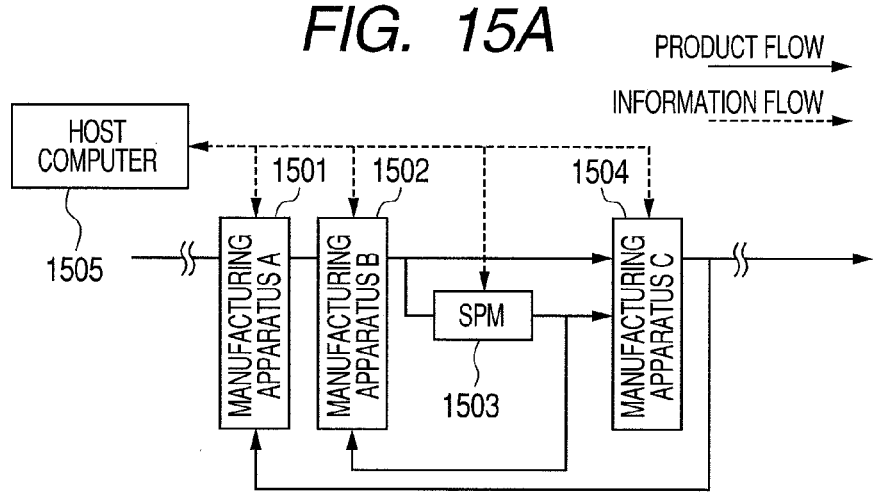
FIG. 15A is a block diagram showing part of a semiconductor manufacturing process using a scanning probe microscope (SPM)
Figure 15B:
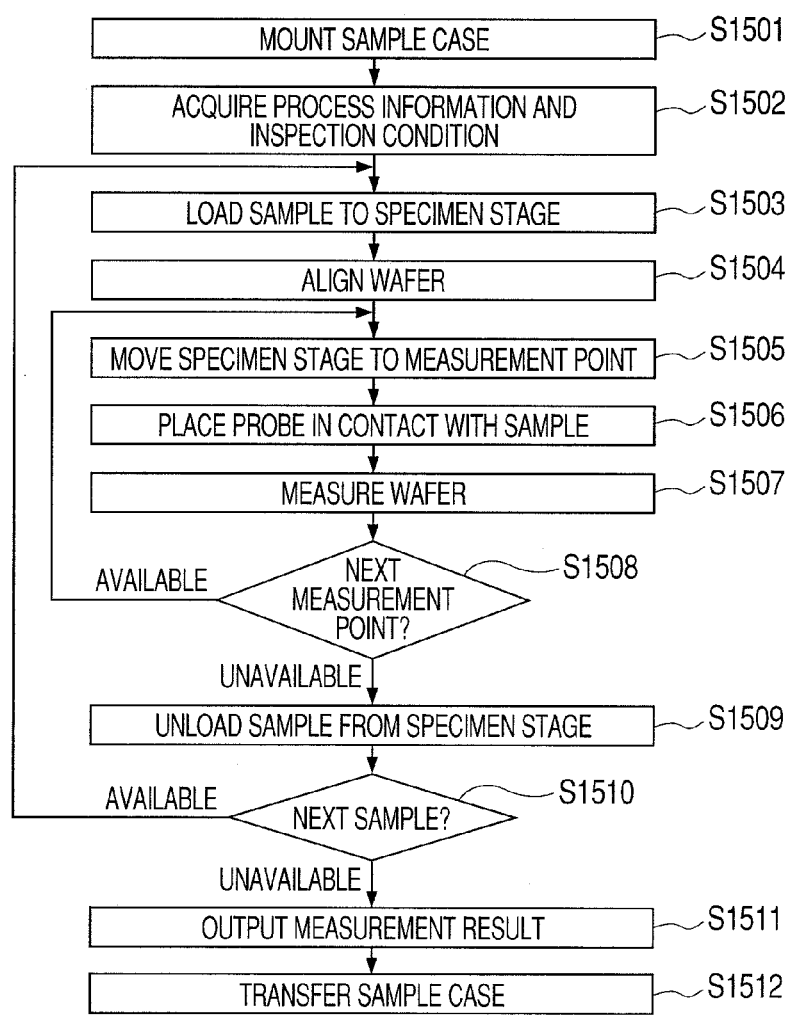
FIG. 15B is a flowchart showing a process of measuring a sample using the scanning probe microscope (SPM) in the semiconductor manufacturing process.

With reference to FIGS. 1, 15A, and 15B, the following describes operations of the SPM according to the invention. FIG. 15A shows part of a semiconductor manufacturing process using the SPM according to the invention and also describes inline SPM functions. The following description assumes a semiconductor manufacturing process and is also applicable to manufacturing processes of the other devices such as hard disks. In this case, a wafer is interchangeable with recording media. The wafer can be cut into row bars each of which is cut into hard disk heads. Accordingly, the wafer is also interchangeable with a hard disk head.

Wafers are processed at manufacturing apparatuses A1501 and B1502 in order. Some wafers are transferred to a process at a manufacturing apparatus C1504 in units of lots. The others are measured at an SPM 1503 and then are transferred to a process at the manufacturing apparatus C1504. An operator previously supplies a host computer with the ratio of these two types of wafers in consideration for the throughput of the SPM 1503 or the number of wafers processed per unit time. All the manufacturing apparatuses 1501, 1502, and 1504, and the SPM 1503 are connected to a host computer 1505 for a semiconductor manufacturing line through a data network. The host computer 1505 manages the history, processes, and the like concerning all wafers in production. A carrier device (not shown) transports wafers between the apparatuses. For example, the manufacturing apparatus A1501 is equivalent to dry etching equipment. The manufacturing apparatus B1502 is equivalent to resist removing equipment. The manufacturing apparatus C1504 is equivalent to coating equipment.

Upon completion of the process at the manufacturing apparatus B1502, wafers are transferred to the SPM 1503 at a predetermined ratio based on wafer process management information managed by the host computer 1505. The SPM 1503 inquires of the host computer 1505 concerning the process management information about the transferred wafers. The SPM 1503 acquires coordinate information about measure points on a wafer and then conducts measurement. Upon completion of the measurement, the SPM 1503 outputs the result of measuring measure points on the wafers to the host computer 1505. The carrier device transfers the wafers to the manufacturing apparatus C1504.

The host computer 1505 analyzes the measurement result acquired from the SPM 1503 and updates (optimizes) process conditions for the manufacturing apparatuses 1501, 1502, and 1504 as needed. For example, the SPM 1503 measures etching differences at multiple positions on wafers and changes the etching condition for the manufacturing apparatus A1501 (dry etching equipment) based on the etching variation. Alternatively, the host computer 1505 may analyze a measurement result from the SPM 1503 and then return the wafer to the manufacturing apparatus 31502 so as to be reprocessed. The process condition in these cases differs from normal process conditions for the manufacturing apparatuses. The host computer 1505 appropriately determines and manages that condition based on the measurement result from the SPM 1503. An operator may attend operations for the above-mentioned feedback (that may be feedforward depending on situations so as to determine process conditions for manufacturing processes subsequent to the SPM 1503 based on the measurement result from the SPM).

The above-mentioned flow of operations determines (optimizes) the process condition of each manufacturing apparatus based on the measurement result from the SPM 1503. Increasing the measurement accuracy of the SPM 1503 makes it possible to more finely configure process conditions for the manufacturing apparatuses. The SPM 1503 can be ideally used as an inline apparatus for semiconductor manufacturing processes when the SPM 1503 completes measurement of a wafer during a period in which a manufacturing apparatus previous to the SPM 1503 completes the process on the wafer and a manufacturing apparatus subsequent to the SPM 1503 starts processing the wafer without intervention of the SPM 1503. Accordingly, improving the inline SPM throughput is mandatory.

FIG. 15B is an explanatory diagram showing a sequence of operations on the SPM 1503 according to the invention. The following describes specific operations of the SPM 1503 with reference to FIG. 1 as well. Wafers are processed at the manufacturing apparatuses 1501 and 1502 previous to the SPM 1503 and are then placed in a case on a lot basis. A carrier device along the semiconductor manufacturing line mounts the case of wafers in a wafer cassette of the SPM 1503 (S1501). The SPM 1503 reads a bar code on the wafer case and acquires process information and inspection conditions corresponding to the bar code from a host computer along the semiconductor manufacturing line (S1502). A loader for the SPM 1503 takes one wafer out of the wafer cassette and places the wafer on the specimen stage 104 so that a wafer notch is oriented flat as specified (S1503).

The SPM 1503 aligns the wafer as follows (S1504). A wafer 103 is placed in vacuum contact with the specimen stage 104. A detector (not shown) reads a wafer number from the surface of the wafer 103. While mounted on the specimen stage 104, the wafer 103 is moved immediately below the probe drive mechanism 101. The specimen stage 104 is positioned in the Z-axis direction at the bottom dead point. The observational optical system 105 is meanwhile raised to the top dead point. A revolver (not shown) is rotated to replace the objective lens 106 with a low-powered aligning objective lens (not shown) at 50-fold magnification, for example. The objective lens 106 and the aligning objective lens use the same parfocal distance. The observational optical system 105 is lowered to adjust the focus position so that the rear surface (top surface) of the probe 102 is focused. The optical image processing section 108 automatically performs the focusing operation using image recognition. The observational optical system 105 is further lowered for a specified amount (e.g., one millimeter) to move the focus position of the observational optical system 105 lower than a position for capturing an SPM image.

The specimen stage 104 moves in the X and Y directions to a position where an alignment mark position on the wafer 103 enters the visual field of the aligning objective lens (not shown). The specimen stage 104 is then gradually raised in the Z direction so that the surface of the wafer 103 corresponds to the focus position of the observational optical system 105. The optical image processing section 108 recognizes an alignment mark image. When the aligning objective lens has a low aperture ratio, the probe 102 may be simultaneously observed in an optical image captured by the observational optical system 105. Accordingly, it is preferable to recognize the alignment mark image at a position where the alignment mark does not overlap the probe 102 in the visual field of the observational optical system 105. The alignment mark on the wafer 103 is recognized at two or more places. An overall control section 114 stores the recognized alignment mark image based on correlation between the pattern on the wafer 103 and the XY coordinate axes of the specimen stage 104.

During the alignment of the wafer 103, the observational optical system 105 is lowered for a specified amount to move the focus position lower than a position for capturing an SPM image. As a result, the surface of the wafer 103 is prevented from being in contact with the tip of the probe 102. After completion of the alignment, the observational optical system 105 is again raised to the top dead point. The revolver (not shown) is rotated to replace the aligning objective lens with the high-powered objective lens 106 at 100-fold magnification, for example. The observational optical system 105 is lowered to adjust the focus position so that the rear surface (top surface) of the probe 102 is focused. The optical image processing section 108 automatically performs the focusing operation using the image recognition. The observational optical system 105 is further lowered for a specified amount (e.g., one millimeter) to move the focus position lower than a position for capturing an SPM image. As mentioned above, the objective lens is replaced during alignment of the wafer 103. Instead, the observational optical system 105 may be provided with an optical zoom function to change the observation magnification without replacing the objective lenses.

The overall control section uses the inspection information (coordinate information) acquired from the host computer and accordingly moves the specimen stage 104 in the X and Y directions to a position where the first measure point enters the visual field of the observational optical system 105 (S1505). The optical image processing section recognizes an image of the measure point (or a pattern around the measure point) contained in the visual field (display area on the TV monitor 107) of the observational optical system 105. The optical image processing section finely adjusts the XY axes of the specimen stage 104 to accurately position the measure point. The objective lens 106 provides 100 magnifications. The observational optical system 105 is lowered for the specified amount (e.g., one millimeter) to move the focus position lower than the position for capturing an SPM image so that the surface of the wafer 103 is observed. The surface of the wafer 103 can be observed at high resolution without being hindered by the probe 102 placed in the visual field of the objective lens 106. When the objective lens 106 is specified to have an aperture ratio of 0.7, for example, a pattern on the wafer 103 can be clearly observed at the resolution of one micrometer or smaller. It is also possible to observe a pattern on the wafer 103 immediately below the probe 102. This technique uses the optical phenomenon available under the condition that the objective lens 106 has a large aperture ratio and the probe 102 occupies only part of the visual field for the objective lens 106.

To position the measure point, an operator may observe the TV monitor 107 and directly specify the coordinate from the overall control section. The observational optical system 105 is raised for a specified amount to adjust the focus position so that the rear surface (top surface) of the probe 102 is focused.

The SPM according to the invention does not require moving the specimen stage 104 during a period in which the measure point is determined in the visual field of the observational optical system 105 and the subsequent measurement operation terminates. A conventional SPM includes a probe drive mechanism immediately above the probe. The visual field position for the observational optical system differs from the SPM image measurement position. The measure point needs to be moved to the SPM image measurement position. This requires a time for operating the stage so that the fine positioning is repeated. It is possible to have a function that observes the measure point and the probe without moving the specimen stage 104. However, the presence of the probe drive mechanism immediately above the probe makes it impossible to increase the aperture ratio of the observational optical system and observe patterns on the wafer surface at sufficient resolution. The SPM according to the invention provides the probe drive mechanism 101 with the through hole 211. The objective lens with a high aperture ratio can be used immediately above the probe 102 so as to observe the measure point and the probe without operating the specimen stage 104.

The following describes the operation (S1506) for placing the tip of the probe 102 in contact with the surface of the wafer 103. The probe drive mechanism 101 is equivalent to a three-dimensional (XYZ) probe scanning mechanical section that uses the piezoelectric element to drive the stage having the elastic deformation section. The probe 102 supported by the probe holder 115 is attached to the bottom of the probe drive mechanism 101. The probe drive mechanism is provided with the through hole for contactlessly inserting the objective lens 106. A focus axis (not shown) of the observational optical system 105 is adjusted to make it possible to observe the probe 102 and the surface of the wafer 103 without moving the specimen stage 104. The probe drive mechanism 101 provides the range of movement such as 20 micrometers in the X-axis direction, 20 micrometers in the Y-axis direction, and 10 micrometers in the Z-axis direction. FIGS. 2A through 2C show the detailed structure of the probe drive mechanism 101.

Figure 16A:
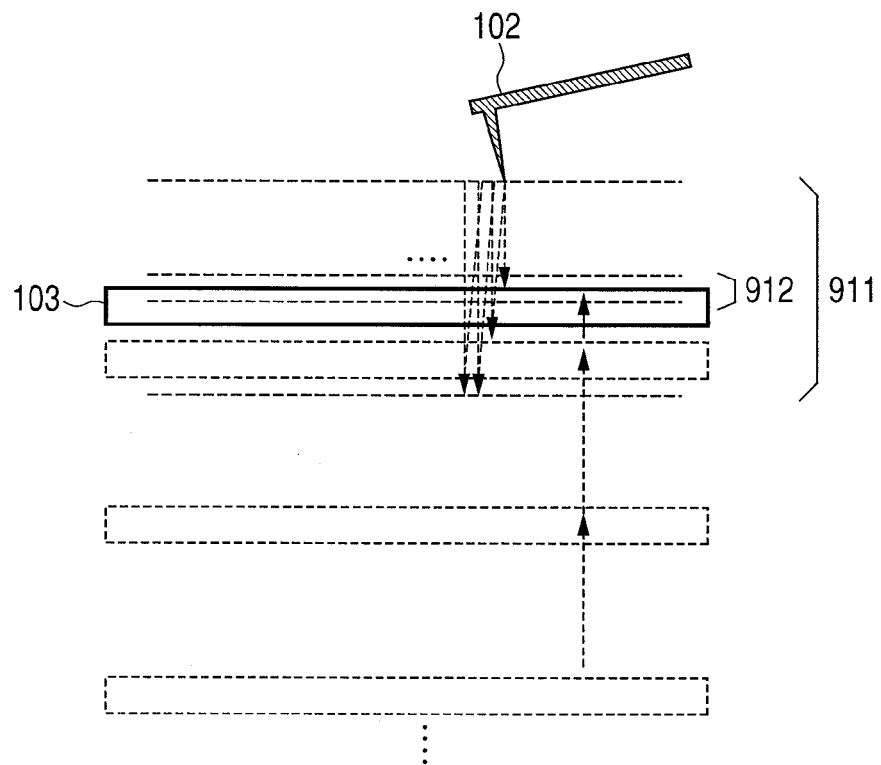
FIG. 16A is a elevational view showing a probe that is measuring a specimen surface.
Figure 16B:
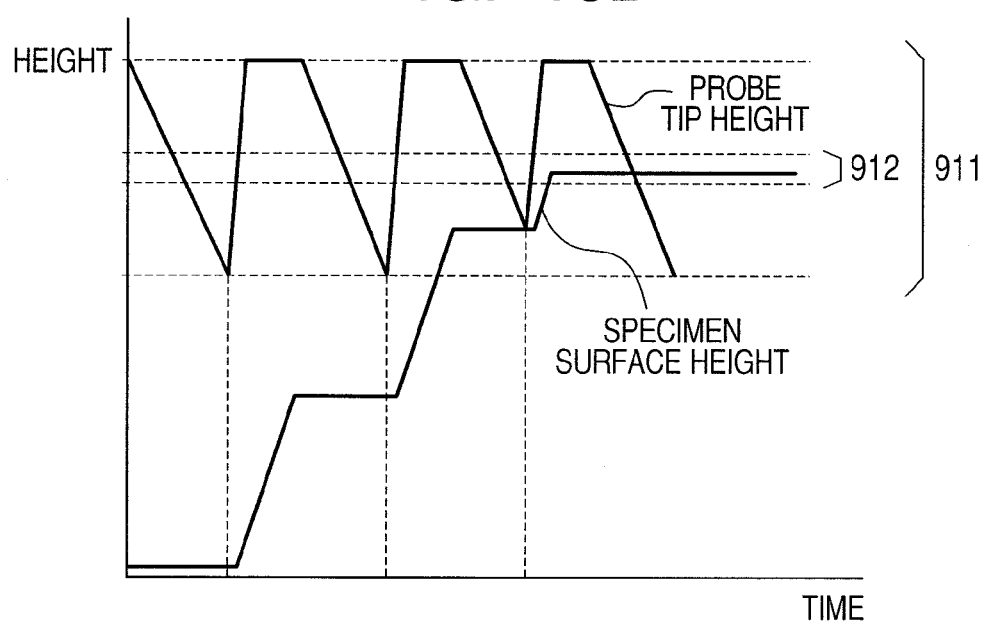
FIG. 16B is a graph showing a time change in heights of the specimen surface and the probe tip while the probe is measuring the specimen surface.

FIGS. 16A and 16B show contact between the tip of the probe 102 and the surface of the wafer 103. The contact is achieved by repeating the steps of: (1) raising the Z-axis of the probe drive mechanism 101 to the top dead point; (2) raising the Z-axis of the specimen stage 104 by ten micrometers; and (3) lowering the Z-axis of the probe drive mechanism 101 to the bottom dead point while a detection signal in the probe deflection detection section 109 is monitored. The detection signal in the probe deflection detection section 109 changes when the tip of the probe 102 is in contact with the surface of the wafer 103 at step (3). The probe scan control section 112 recognizes this change to detect the contact between both. FIG. 3 illustrates the operating principle in detail.

FIG. 16B shows that the probe 102 is in contact with the specimen 103 when the probe 102 is lowered the third time at step (3). Thereafter, the probe 102 is further raised to the top dead point. The Z-axis of the specimen stage 104 is then raised by an amount calculated so that the specimen surface height enters a range of target height 912 provided around the center of a range of Z-direction movement 911 for the probe 102. The probe 102 is then lowered again until contact is detected between the tip of the probe 102 and the surface of the wafer 103 (S1507). The above-mentioned method drives only the probe 102 capable of more high-precision control while the probe is in contact with a specimen. The method can prevent the fine probe tip from being damaged due to an excess force that may be applied to the probe 102 in contact with the specimen 103 while the Z axis for the specimen is driven.

Figure 17A:
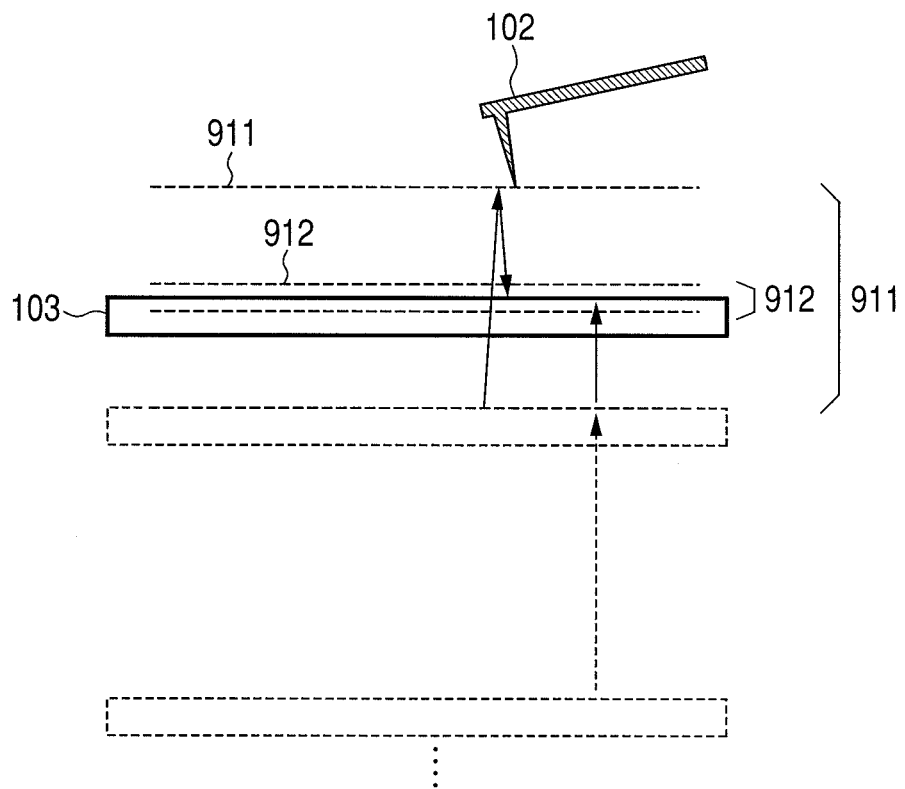
FIG. 17A is an elevational view showing another example of a probe that is measuring a specimen surface.
Figure 17B:
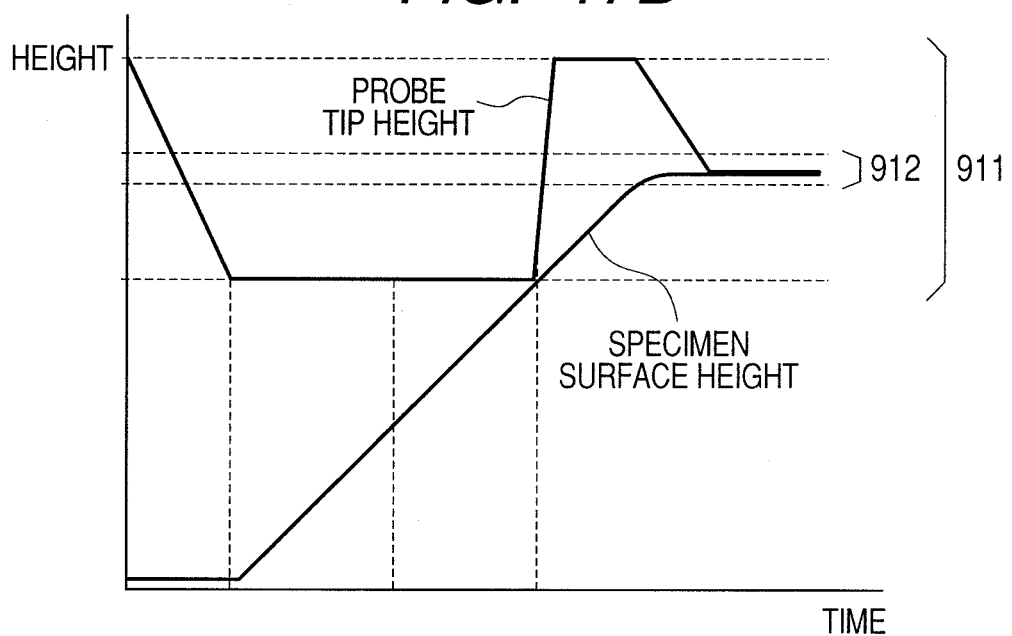
FIG. 17B is a graph showing another example of a time change in heights of the specimen surface and the probe tip while the probe is measuring the specimen surface.

With reference to FIGS. 17A and 17B, the following describes another method of bringing the probe 102 and the specimen 103 close to each other. In this example, a specimen Z stage raises the specimen 103 while the probe 102 is lowered to the bottom dead point. As soon as contact is detected between the specimen 103 and the probe 102, the probe 103 is fast retracted to the top dead point. This method minimizes the duration of contact between the probe 102 and the surface of the specimen 103 oscillating due to a driving force and prevents the tip of the probe 102 from being damaged. The specimen 103 is continuously raised by a specified amount and then stops. The amount is calculated so that the surface of the specimen 103 enters the range of target height 912 provided around the center of the range of movement 911 for the probe 102. Thereafter, the probe 102 is lowered again until contact is detected between the tip of the probe 102 and the surface of the wafer 103.

After the contact is detected between the tip of the specimen 103 and the surface of the probe 102, the probe drive mechanism 101 is driven so that the probe 102 scans to capture an SPM image. For example, a one-square-micrometer region on the wafer 103 is divided into 256 portions in the X direction and ten portions in the Y direction. For example, the probe 102 is raised one micrometer. The contact position is then moved in the X direction (Y direction) successively to repeatedly detect contact between the probe 102 and the surface of the wafer 103. The contact is detected by operating only the probe 102 in the range of movement of the probe drive mechanism 101 without moving the specimen stage 104. The probe scan control section 112 allows the probe drive control section 110 to control operations of the probe drive mechanism 101. As shown in FIGS. 11A and 11B, the capacitance sensors are attached to the movement axes (X, Y, and Z stages) of the probe drive mechanism 101. The stage displacement detection section 128 detects displacement of each capacitance sensor. The detected displacement passes through the probe scan control section 112 and then is stored in an SPM image generation section 113. The SPM image generation section 113 generates an XY planar distribution image for the displacement of the probe 102, i.e., the Z stage displacement of the probe drive mechanism 101. The displacement is measured while the probe 102 is in contact with contact points on the wafer 103. The piezoelectric elements used for the probe drive mechanism 101 can operate at a response rate of 2 to 3 kHz. The above-mentioned measurement operation terminates in several seconds. The obtained SPM image (data) is stored in the overall control section.

Measurement coordinates and the number of measure points are predetermined on the wafer 103. When the wafer 103 still contains measure points to be measured, the observational optical system 105 and the specimen stage 104 are lowered by the same amount. The XY coordinate of the stage 104 is moved to that for the next measure point and the measurement operation restarts (S1508). When the wafer 103 contains no measure points to be measured, the observational optical system 105 and the specimen stage 104 are lowered by the same amount. The wafer 103 is unloaded from the specimen stage 104 (S1509). When the wafer case contains the next wafer to be measured, the wafer is loaded on the specimen stage 104 and the measurement is repeated (S1510). When the measurement is completed on all wafers in the wafer case, the data stored in the overall control section 114 is output to the host computer (S1511). The carrier device (not shown) transfers the wafer case to the next process apparatus (S1512).

Every time a measurement position is changed on the same wafer, a conventional SPM needs to recognize another measurement position using the observational optical system for measurement positioning and move the specimen stage to a probe scanning mechanical section (position of the probe 102). The specimen stage operation requires two to three seconds when there is an interval of 150 millimeters between the position of the observational optical system for measurement positioning and the probe scanning mechanical section (position of the probe 102). When a wafer contains ten measure points, the specimen stage operation requires a total of 20 to 30 seconds for measurement positioning. This greatly degrades the SPM measurement throughput. Operations of the SPM according to the invention adjust the focus of the observational optical system 105 and make it possible to observe the probe 102 and the surface of the wafer 103 without moving the specimen stage 104. The SPM can omit the time needed for the measurement positioning. As a result, the SPM requires just two minutes (30 WPH) or less for a sequence of apparatus operations per wafer to be measured such as loading a wafer, measuring etching differences at nine measurement positions, and unloading the wafer, for example. It is possible to provide an inline SPM with improved throughput.

Figure 18A:
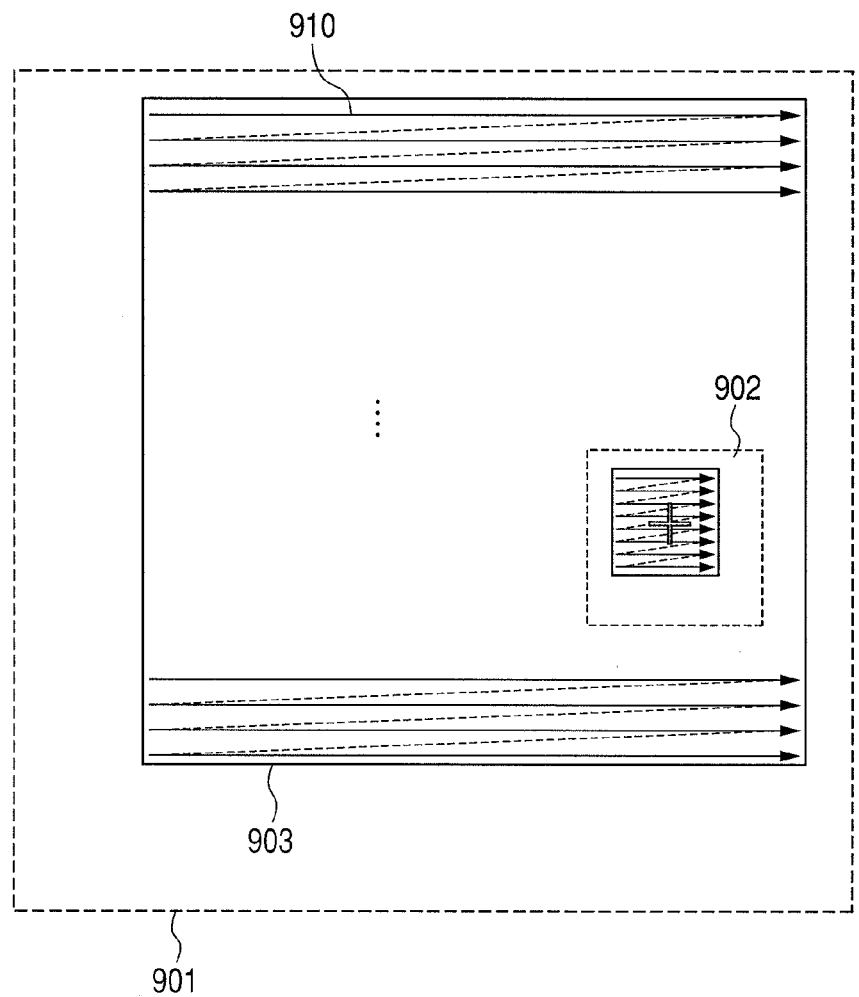
FIG. 18A is a plan view of a specimen whose measurement region the probe detects by broadly scanning according to coarse adjustment.
Figure 18B:
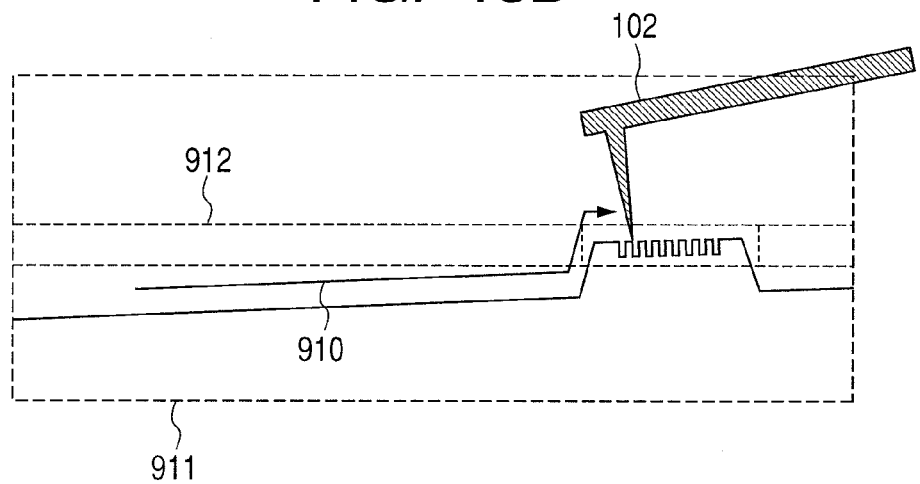
FIG. 18B is a plan view of a probe that is measuring a measurement region.

With reference to FIGS. 18A and 18B, the following describes operations according to the invention for accurately specifying a measurement position based on an SPM measurement result, not on coordinates for the specimen-side XY stage 401 or an observation result from the observational optical system 105 as an optical microscope. Reference numeral 901 denotes an available range of scan using a coarse adjustment piezoelectric element of the probe 102. In the range 901, a range 903 is assumed to contain a pattern to be measured. The probe 102 scans the range 903 to acquire a measurement result 910. When the pattern is found, the probe 102 accurately measures only an area containing the pattern. The area may be smaller than a size 902 or an area that a fine adjustment piezoelectric element can measure or scan. In such case, the coarse adjustment piezoelectric element is fixed and only the fine adjustment piezoelectric element can be used for scan so as to perform the high-precision measurement. The Z axis may be provided with two types of actuators for coarse adjustment and fine adjustment. In such case, the coarse adjustment piezoelectric element position is adjusted so that the height of an area to be measured enters a control width 912 for the fine adjustment piezoelectric element. The height is then measured. In this manner, the height can also be measured highly accurately.

Figure 19:
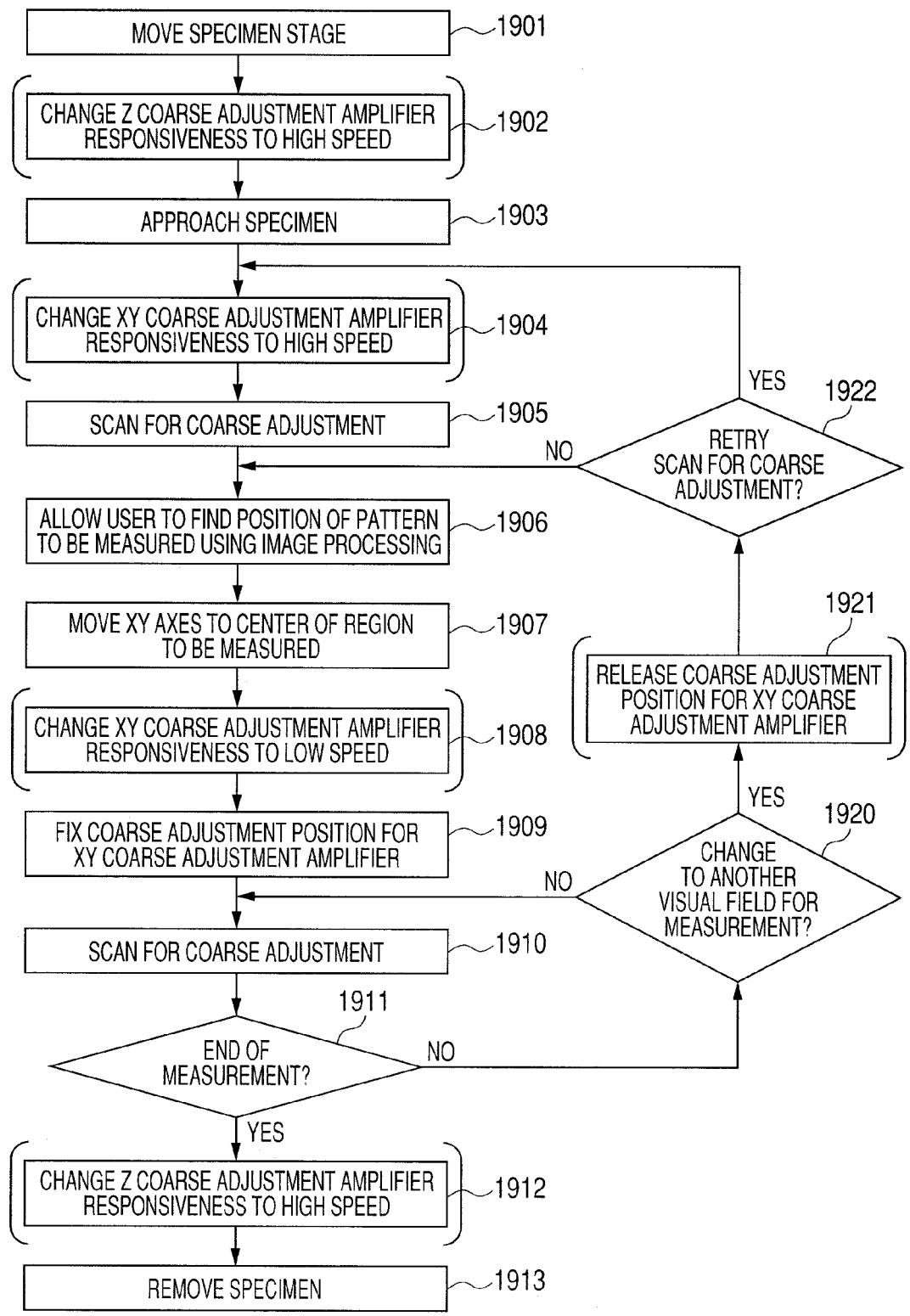
FIG. 19 is a flowchart showing a process corresponding to operations in FIGS. 18A and 18B.

FIG. 19 shows the measurement sequence. The specimen stage is moved to place the probe 102 to a position for measurement on the specimen 103 (S1901). The Z coarse adjustment amplifier responsiveness is explicitly changed to high speed as needed (S1902). The process for approaching the specimen is performed as described with reference to FIGS. 16A to 17B (S1903). The XY coarse adjustment amplifier responsiveness is explicitly changed to high speed as needed (S1904). The probe 102 scans according to the coarse adjustment for measurement (S1905). The probe scan control section 112 in FIG. 1 controls these steps. The position of a pattern to be measured is found from images generated from the SPM image generation section 113 by automatically processing the image with the overall control section 144 or by manually designating on the display (S1906).

The XY axes are moved to the center of the region to be measured (S1907). The XY coarse adjustment amplifier responsiveness is explicitly changed to low speed as needed (S1908). Alternatively, the coarse adjustment position is fixed (S1909). The same process is performed on the Z axis when a coarse/fine adjustment mechanism is provided for the Z axis. The fine adjustment piezoelectric element then scans the probe 102 to provide the high-precision measurement at high magnification (S1910). To terminate the measurement (S1911), the Z coarse adjustment amplifier responsiveness is explicitly changed to high speed as needed (S1912). The specimen 103 is then removed (S1913). The measurement restarts from the scan for fine adjustment when further zooming is needed within the same visual field for fine scanning or the measurement position needs to be remeasured a little more.

When another visual field is used for the measurement (S1920), the measurement restarts from a position determined by the image process or the user specification. When the scan range for coarse adjustment contains no pattern to be measured, the XY coarse adjustment amplifier responsiveness is explicitly changed to high speed as needed (S1921). The scan range for coarse adjustment is changed and the scan restarts (S1922).

The above-mentioned sequence is capable of high-speed and high-precision measurement while switching between the high-speed scan in a wide range and the high-precision scan in a narrow range according to the invention.

An embodiment of a laser interference displacement meter will be described with reference to FIGS. 20 and 21A through 21C. The laser interference displacement meter is used for the invention as another displacement meter than the capacitance sensor. The capacitance sensor detects a distance to the flat metal electrode as a target by converting the distance into a change in the electrostatic capacitance. The laser interference displacement meter detects a distance to a flat mirror by converting the distance into a phase of the interference fringe.

Figure 20:
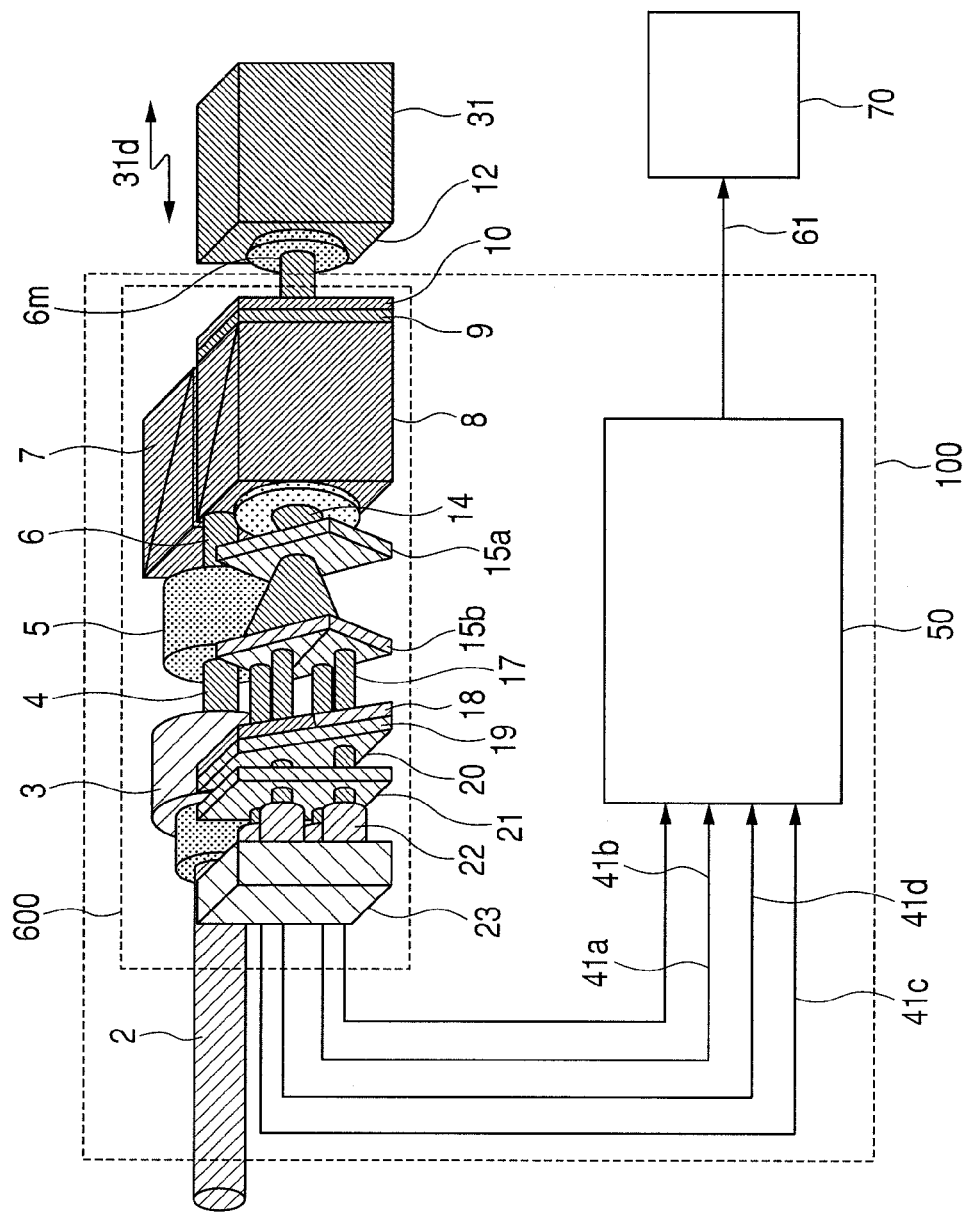
FIG. 20 is a perspective view of an optical interference/displacement sensor.

As shown in FIG. 20, an optical interference/displacement sensor according to the embodiment includes an optical source unit (not shown), a sensor unit 100, and a displacement output unit 70. A frequency-stabilizing He—Ne laser generates a linear polarized laser beam with the wave length of 632.8 nm. The optical source unit guides that laser beam to the sensor unit 100 in the 45-degree polarization direction through a polarization-preserving fiber 2.

The sensor unit 100 includes an interferometer 600 and a displacement processing unit 50. The interferometer 600 uses a collimator 3 to transform the 45-degree polarized light from the polarization-preserving fiber 2 into parallel light 4. The parallel light 4 passes through a polarization element 5 such as a Glan-Thompson prism. Transmitted light 6 is reflected on a prism mirror 7 and a non-polarization beam splitter 8. The reflected light enters a reference mirror 9.

Figure 21A:
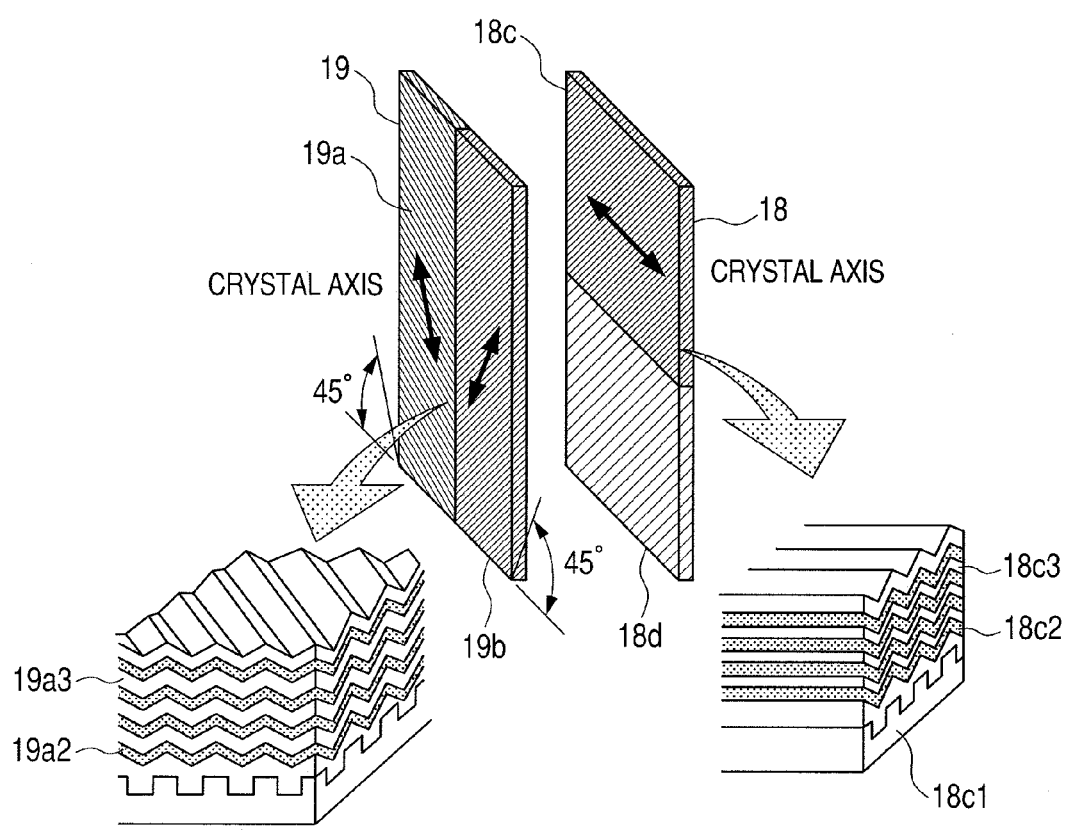
FIG. 21A shows a perspective view and a partially enlarged view illustrating the structure of a phase shift element used for the optical interference/displacement sensor.
Figure 21B:
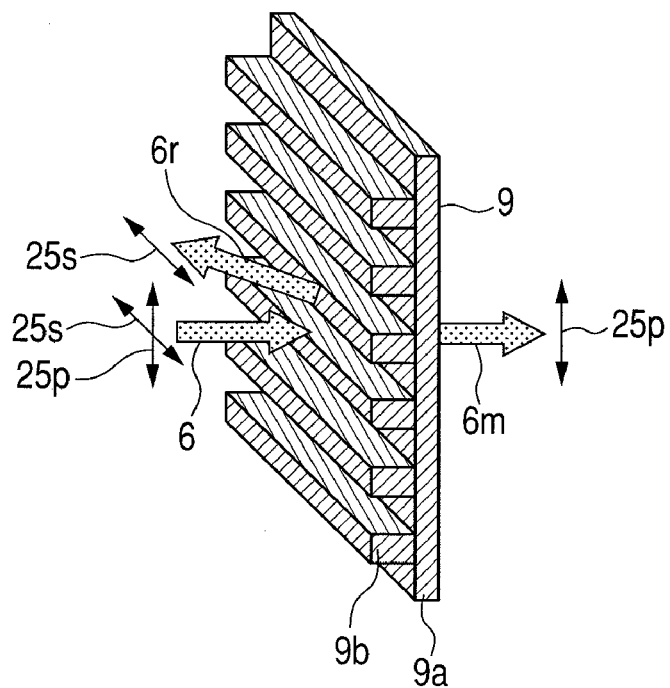
FIG. 21B is a perspective view of a wire grid polarizer used as a reference mirror for the optical interference/displacement sensor.

As shown in FIG. 21B, the reference mirror 9 includes a diffraction grating 9b formed on a synthetic silica substrate 9a made of a metal material such as aluminum. A polarized beam 6 which has a polarization direction in 45-degree and enters the diffraction grating contains two orthogonal polarization components. An S polarization component 25s parallels the diffraction grating in the longer direction and reflects on the diffraction grating. A P polarization component 25p is orthogonal to the diffraction grating in the longer direction and passes through the diffraction grating. The diffraction grating shows characteristics of a so-called wire grid polarizer. The diffraction grating 9b according to the embodiment is formed at intervals of 144 nm. Each line is 65 nm wide and 165 nm high.

An S polarized beam 6r reflects on the reference mirror 9 and is used as reference light. A transmitted P polarized beam 6m is used as measurement light. The P polarized beam 6m passes through a quarter wavelength plate 10 and then transforms into circularly polarized light. The circularly polarized light reflects on a target mirror 12 placed on a measurement object 31. The circularly polarized light again passes through the quarter wavelength plate 10 and then transforms into an S polarized beam. The S polarized beam reflects on the reference mirror 9. The S polarized beam passes through the quarter wavelength plate 10 and transforms into circularly polarized light that is then reflects on the target mirror 12. The circularly polarized light passes through the quarter wavelength plate 10 and then transforms into a P polarized beam. The P polarized beam passes through the reference mirror 9. The P polarized beam 6m as the measurement light reciprocates twice along an optical path between the reference mirror 9 and the target mirror 12 so as to detect a travel distance 31d of the measurement object 31 as a double magnification. The S polarized beam 6r reflected on the reference mirror 9 and the P polarized beam 6m passing through the reference mirror 9 are synthesized into an orthogonally polarized beam 14 that then passes through the non-polarization beam splitter 8.

The orthogonally polarized beam 14 passes through an aperture 13 for removal of stray light. The beam is then divided into four orthogonally polarized beams 17 through two square pyramid prisms 15a and 15b placed opposite to each other. Not only prisms but also diffraction optical elements may be used to divide the beam. The four orthogonally polarized beams 17 pass through phase shift elements 18 and 19 and are polarized and interfered while phase shifts 0, $\pi/2$, $\pi$, and $3\pi/2$ are provided between orthogonal polarization components. As a result, four phase-shift interfering light beams 20 are generated.

As shown in the right side of FIG. 21A, the phase shift element 18 is divided into two portions. The lower half configures synthetic silica 18d. The upper half configures photonic crystal 18c. As seen from an enlarged view, the photonic crystal 18c is formed into a diffraction grating on a synthetic silica substrate 18c1 so as to contain lines and gaps when viewed in a horizontal direction. Each gap is smaller than the incident light wavelength. Dielectric thin films 18c2 and 18c3 with different refractive indexes are layered on the diffraction grating. The rectangular corrugation of the diffraction grating maintains the triangular corrugation along the film thickness direction as seen from a sectional view of the thin film layers on the diffraction grating. Available thin film materials include Si, $SiO_2$, $TiO_2$, $Ta_2O_5$, and $Nb_2O_5$. The multilayer thin film structure using such diffraction grating provides the photonic crystal whose crystal axis direction corresponds to the diffraction grating direction. The photonic crystal indicates double refraction characteristics due to diffraction and interference between multilayer thin films, making it possible to control polarization, transmissivity, and reflection characteristics of the incident light (see the product catalog from Photonic Lattice, Inc.)

The photonic crystal 18c is controlled in terms of the interval and the depth of the diffraction grating and the thin film thicknesses in consideration for the wavelength of incident light and targeted characteristics. It is also an important feature that polarization elements and wavelength elements with different crystal axis directions can be formed in an array on a single substrate using film formation techniques such as the photolithographic technique and the sputtering incorporated into semiconductor device manufacturing. The photonic crystal 18c also functions as a quarter wavelength plate. A thick arrow indicates the crystal axis direction. As shown in FIG. 20, two of the four orthogonally polarized beams 17 pass through the photonic crystal 18c and cause a phase difference of π/2 between two polarization components. The remaining two orthogonally polarized beams pass through the synthetic silica 18d and cause no phase difference.

As shown in the left side of FIG. 21A, a phase shift element 19 is divided into two portions. The left half of the phase shift element 19 configures photonic crystal 19a having the 45-degree crystal axis direction. The right half of the phase shift element 19 configures photonic crystal 19b having the 45-degree reverse crystal axis direction. As seen from an enlarged view, the photonic crystal 19a, like the photonic crystal 18c, is formed into a diffraction grating on a synthetic silica substrate 19a1 so as to contain lines and gaps when viewed in a 45-degree direction. Each gap is smaller than the incident light wavelength. Dielectric thin films 19a2 and 19a3 with different refractive indexes are layered on the diffraction grating. The photonic crystal 19b is also structured similarly. The photonic crystals 19a and 19b also function as polarization elements. A thick arrow indicates the crystal axis direction. As shown in FIG. 20, two of the four orthogonally polarized beams 17 pass through photonic crystal 19a and contain two polarization components. The remaining two orthogonally polarized beams pass through the photonic crystal 19b and contain two polarization components. The former and the latter polarization components are relatively provided with phase difference π and interfere with each other.

The four orthogonally polarized beams 17 pass through phase shift elements 18 and 19 and are polarized and interfered while phase shifts 0, π/2, π, and 3π/2 are provided between orthogonal polarization components of the orthogonally polarized beams 17. As a result, four phase-shift interfering light beams 20 are generated. To prevent an effect of ambient light, the four phase-shift interfering light beams 20 pass through an interference filter 21 whose transmission center wavelength belongs to the wavelength of 632.8 nm. The phase-shift interfering light beams are then respectively received by four photoelectric conversion elements 22 such as photodiodes, are amplified by an amplifier 23, and are output as four phase-shift interference signals 41a, 41b, 41c, and 41d.

The following equations (1) through (4) express the four phase-shift interference signals 41a, 41b, 41c, and 41d.

$$Ia = Im + Ir + 2(Im \cdot Ir)1/2\cos(4\pi nD/\lambda) \quad \text{(equation 1)}$$

$$Ib = Im + Ir + 2(Im \cdot Ir)1/2\cos(4\pi nD/\lambda + \pi) \quad \text{(equation 2)}$$
$$= Im + Ir - 2(Im \cdot Ir)1/2\cos(4\pi nD/\lambda)$$

$$Ic = Im + Ir + 2(Im \cdot Ir)1/2\cos(4\pi nD/\lambda + \pi/2) \quad \text{(equation 3)}$$
$$= Im + Ir + 2(Im \cdot Ir)1/2\sin(4\pi nD/\lambda)$$

$$Id = Im + Ir + 2(Im \cdot Ir)1/2\cos(4\pi nD/\lambda + 3\pi/2) \quad \text{(equation 4)}$$
$$= Im + Ir - 2(Im \cdot Ir)1/2\sin(4\pi nD/\lambda)$$

where Im denotes the probe light detection intensity, Ir denotes the reference light detection intensity, n denotes the refractive index of air, D denotes the travel distance 31d to the measurement object 31, and λ denotes the wavelength of the laser beam 4.

The displacement processing unit 50 calculates travel distance D to the measurement object 31 based on equation (5) below and displays travel distance D as a travel distance signal 61 on the displacement output unit 70.

$$D = (\lambda/4\pi n)\tan^{-1}\{(Ic-Id)/(Ia-Ib)\} \quad \text{(equation 5)}$$

Figure 21C:
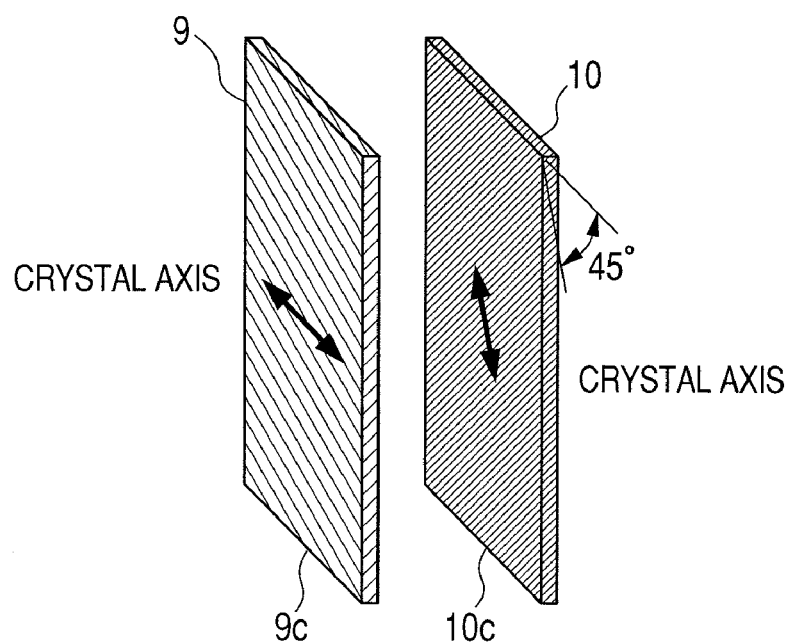
FIG. 21C shows a perspective view of photonic crystal used as a reference mirror for the optical interference/displacement sensor and a perspective view of photonic crystal used as a quarter wavelength plate.

The embodiment uses a wire grid polarizer as the reference mirror 9. As is clear from the description so far, the reference mirror 9 may be interchangeable with the photonic crystal 9c having the horizontal crystal axis direction as shown in FIG. 21C. Similarly, the quarter wavelength plate 10 may be interchangeable with the photonic crystal 10c having the 45-degree crystal axis direction. To further simplify the interferometer 600, the phase shift element 19 may include only the photonic crystal 19a in FIG. 21A. Since the phase-shift interference signals 41a and 41c are found from equations (1) and (3), the two interference signals may be used to determine travel distance D to the measurement object 31.

As is clear from FIG. 20, the measurement light 6m and the reference light 6r are directed to the target mirror 12. These two beams are radiated from the optical source unit, enter the sensor unit 100, reach the reference mirror 9, and are received by the photoelectric conversion elements 22 along the completely same optical path. This is equivalent to the configuration of an interferometer using the common optical path. The optical path may be subject to not only temperature distribution or refractive index distribution due to variations in the atmosphere or the like but also mechanical vibration. These disturbing factors equally influence the both beams. When the both beams interfere with each other, an influence from the disturbing factors is completely canceled. The interfering light is free of influence from disturbing factors. Only the measurement light 6m exists along the optical path between the reference mirror 9 and the target mirror 12. For example, the scanning probe microscope causes a travel of several hundreds of microns at the most. A gap between the reference mirror 9 and the target mirror 12 can be configured to be one millimeter or smaller. An influence from disturbing factors is negligible in such a microscopic gap. The intensity of the laser beam itself varies with probe light detection intensity Im and reference light detection intensity Ir as seen from equations (1) through (4). The displacement processing unit 50 cancels the variation using the subtraction and the division in equation (5).

The optical interference/displacement sensor according to the embodiment generates four orthogonally polarized beams based on the simple configuration. The phase shift elements arranged in an array generate spatially parallel four phase-shift interfering light beams and they are received by the optical interference/displacement sensor. Consequently, optical parts are greatly reduced in comparison with conventional phase-shift interferometers. The displacement sensor can be significantly miniaturized. Specifically, the interferometer 600 can be downsized to 20×15×50 mm or smaller. The four phase-shift interfering light beams pass through adjacent optical paths. The optical paths can be configured so as to minimize an influence of disturbing factors such as temperature distribution, humidity distribution, atmospheric pressure distribution, density distribution, and air flow changes due to variations in the atmosphere or the like.

The optical interference/displacement sensor according to the embodiment can stably measure the travel distance or the position of a measurement object with accuracy ranging from subnanometers up to ten picometers without precisely controlling environmental factors such as temperature, humidity, atmospheric pressure, density, and acoustic vibration. The optical interference/displacement sensor can be used for controlling the SPM scan mechanism based on feedback so as to be able to stably control the position at the tip of an SPM probe with accuracy ranging from subnanometers up to ten picometers. A high-precision SPM apparatus can be provided.

The invention may be embodied in other specific forms without departing from the spirit or essential characteristics thereof. The present embodiments are therefore to be considered in all respects as illustrative and not restrictive, the scope of the invention being indicated by the appended claims, rather than by the foregoing description, and all changes which come within the meaning and range of equivalency of the claims are therefore intended to be embraced therein.

What is claimed is:

1. A scanning probe microscope, comprising:
    a probe section having a cantilever and a probe fixed near a tip of the cantilever;
    probe section drive means for driving the probe section so that the probe scans a specimen surface by repeatedly being close to or in contact with the specimen surface and being apart from the specimen surface;
    displacement amount detection means for detecting a displacement amount of the probe section while the probe section drive means driving the probe; and
    signal processing means for acquiring shape information about the specimen surface based on the displacement amount of the probe section detected by the displacement amount detection means,
    wherein the probe section drive means includes:
    a drive section for independently driving the probe in three mutually-perpendicular axis directions; and
    a drive speed switch section for switching a responsiveness of the drive section, at least in one axis direction while the drive section drives the probe section, depending on the distance from the target point along the corresponding axis.

2. The scanning probe microscope according to claim 1, wherein the drive speed switch section switches a drive speed in accordance with a travel distance of the probe section at least in the one axis direction.

3. The scanning probe microscope according to claim 1, wherein the displacement amount detection means is configured as a capacitance displacement meter.

4. The scanning probe microscope according to claim 1, wherein the displacement amount detection means is configured as a laser interference displacement meter.

5. The scanning probe microscope according to claim 1,
    wherein the drive speed switch section switches the drive speed between high-speed response and low-speed response;
    wherein a time constant for the high-speed response ranges from 0.1 to five milliseconds; and
    wherein a time constant for the low-speed response ranges from five to 100 milliseconds.

6. The scanning probe microscope according to claim 1,
    wherein the probe drive means includes a drive section;
    wherein the drive section provides at least one of three mutually-perpendicular axis directions with a drive section that combines a coarse adjustment actuator having a wide range of movement with a fine adjustment actuator having a narrow range of movement for driving the probe; and
    wherein the drive speed switch section switches a drive speed for a coarse adjustment actuator in at least one of the three axis directions.

7. The scanning probe microscope according to claim 6, wherein the drive speed switch section switches a drive speed in accordance with a travel distance at least in the one axis direction.

8. A measurement method using a scanning probe microscope, comprising the steps of:
    driving a probe section having a cantilever and a probe fixed near a tip of the cantilever so that the probe scans a specimen surface by repeatedly being close to or in contact with the specimen surface and being apart from the specimen surface;
    detecting a displacement amount of the probe section scanning the specimen surface; and
    acquiring shape information about the specimen surface based on the detected displacement amount of the probe section,
    wherein the probe is driven to scan the specimen surface by switching a responsiveness, in at least one axis direction while driving, depending on the distance from the target point along the corresponding axis.

9. The measurement method using a scanning probe microscope according to claim 8, wherein a drive speed at least in the one axis direction is switched correspondingly to a travel distance in the one axis direction.

10. The measurement method using a scanning probe microscope according to claim 8, wherein a capacitance displacement meter detects the displacement amount of the probe section.

11. The measurement method using a scanning probe microscope according to claim 8, wherein a laser interference displacement meter detects the displacement amount of the probe section.

12. The measurement method using a scanning probe microscope according to claim 8,
    wherein the drive speed is switched between high-speed response and low-speed response during scan over the specimen surface;
    wherein a time constant for the high-speed response ranges from 0.1 to five milliseconds; and
    wherein a time constant for the low-speed response ranges from five to 100 milliseconds.

13. The measurement method using a scanning probe microscope according to claim 8, wherein a drive speed at least in the one axis direction is switched for scanning during driving by switching a drive speed of a coarse adjustment actuator having a wide range of movement for driving the probe rather than a fine adjustment actuator having a narrow range of movement for driving the probe.

14. The measurement method using a scanning probe microscope according to claim 13, wherein a drive speed at least in the one axis direction is switched correspondingly to a travel distance in the one axis direction.

15. The measurement method using a scanning probe microscope according to claim 13, wherein a capacitance displacement meter detects the displacement amount of the probe section.

16. The measurement method using a scanning probe microscope according to claim 13, wherein a laser interference displacement meter detects the displacement amount of the probe section.

17. The measurement method using a scanning probe microscope according to claim 13,
    wherein the drive speed is switched between high-speed response and low-speed response during scan over the specimen surface;
    wherein a time constant for the high-speed response ranges from 0.1 to five milliseconds; and
    wherein a time constant for the low-speed response ranges from five to 100 milliseconds.

* * * * *